US012726554B2

(12) United States Patent
Jung

(10) Patent No.: US 12,726,554 B2
(45) Date of Patent: Sep. 1, 2026

(54) CONTROL OF RESOURCE UTILIZATION IN WIRELESS COMMUNICATION SYSTEM

(71) Applicant: LG Electronics Inc., Seoul (KR)

(72) Inventor: Sunghoon Jung, Seoul (KR)

(73) Assignee: LG Electronics Inc., Seoul (KR)

( * ) Notice: Subject to any disclaimer, the term of this patent is extended or adjusted under 35 U.S.C. 154(b) by 374 days.

(21) Appl. No.: 18/570,599

(22) PCT Filed: Aug. 2, 2022

(86) PCT No.: PCT/KR2022/011349
§ 371 (c)(1),
(2) Date: Dec. 14, 2023

(87) PCT Pub. No.: WO2023/014028
PCT Pub. Date: Feb. 9, 2023

(65) Prior Publication Data

US 2024/0430953 A1 Dec. 26, 2024

(30) Foreign Application Priority Data

Aug. 4, 2021 (KR) ........................ 10-2021-0102702

(51) Int. Cl.
*H04L 69/28* (2022.01)
*H04W 74/0833* (2024.01)
*H04W 74/0836* (2024.01)
*H04W 74/0838* (2024.01)

(52) U.S. Cl.
CPC ......... *H04L 69/28* (2013.01); *H04W 74/0833* (2013.01); *H04W 74/0836* (2024.01); *H04W 74/0838* (2024.01)

(58) Field of Classification Search
CPC .............. H04L 69/28; H04W 74/0833; H04W 74/0836; H04W 74/0838; H04W 74/006; H04W 76/15
See application file for complete search history.

(56) References Cited

U.S. PATENT DOCUMENTS

2017/0135134 A1* 5/2017 Rune ..................... H04W 74/04
2020/0106573 A1* 4/2020 Cirik ..................... H04L 5/0098
2020/0245198 A1 7/2020 Nagaraja et al.
(Continued)

FOREIGN PATENT DOCUMENTS

WO WO 2018/175721 A1 9/2018
WO WO 2019/100254 A1 5/2019

OTHER PUBLICATIONS

Khodapanah, Behnam, et al. "On L1/L2-triggered mobility in 3GPP release 18 and beyond." IEEE Access 12 (2024): 171790-171806. (Year: 2024).*

(Continued)

*Primary Examiner* — Sharad Rampuria
(74) *Attorney, Agent, or Firm* — Fish & Richardson P.C.

(57) ABSTRACT

The present disclosure related to a control of resource utilization in wireless communications. According to an embodiment of the present disclosure, a network may control a validity of dedicated physical random access channel (PRACH) resource for secondary cell group (SCG) activation. Therefore, the network can efficiently utilize the RACH resources configured to a UE by opportunistically or exclusively reusing the resources for other UEs.

15 Claims, 21 Drawing Sheets

(56) References Cited

U.S. PATENT DOCUMENTS

2020/0314913 A1 10/2020 Rastegardoost et al.
2024/0022944 A1* 1/2024 Freda .................... H04W 24/10

OTHER PUBLICATIONS

CATT, "The validity of CFRA resources for BFR," R2-1804484, 3GPP TSG-RAN WG2#101bis, Sanya, China, Apr. 16-20, 2018, 4 pages.
Extended European Search Report in European Appln. No. 22853405.3, mailed on Oct. 14, 2024, 9 pages.
3GPP TS 38.300 V16.6.0 (Jun. 2021), 3rd Generation Partnership Project Technical Specification Group Radio Access Network, NR, NR and NG-RAN Overall Description Stage 2 (Release 16), Jun. 2021, 152 pages.
International Search Report and Written Opinion in Appln. No. PCT/KR2022/011349, mailed on Nov. 3, 2022, 3 pages.

* cited by examiner

Figure 1:
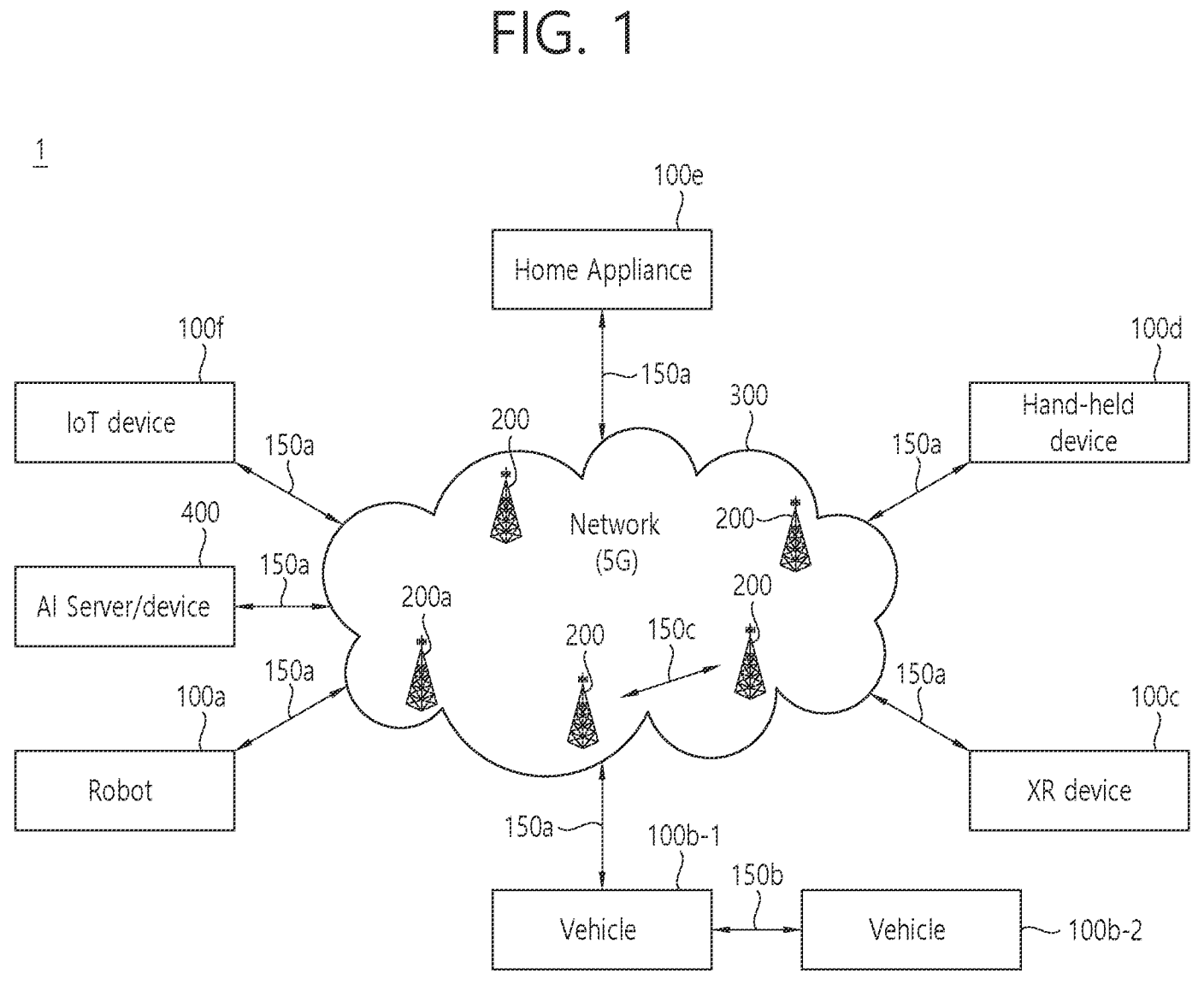

100d Hand-held device

100c XR device 100b-2 Vehicle 100b-1 Vehicle

150b

100e Home Appliance

300 Network (5G)

200

200a

150a

150c

100f IoT device

400 AI Server/device

100a Robot

FIG. 3

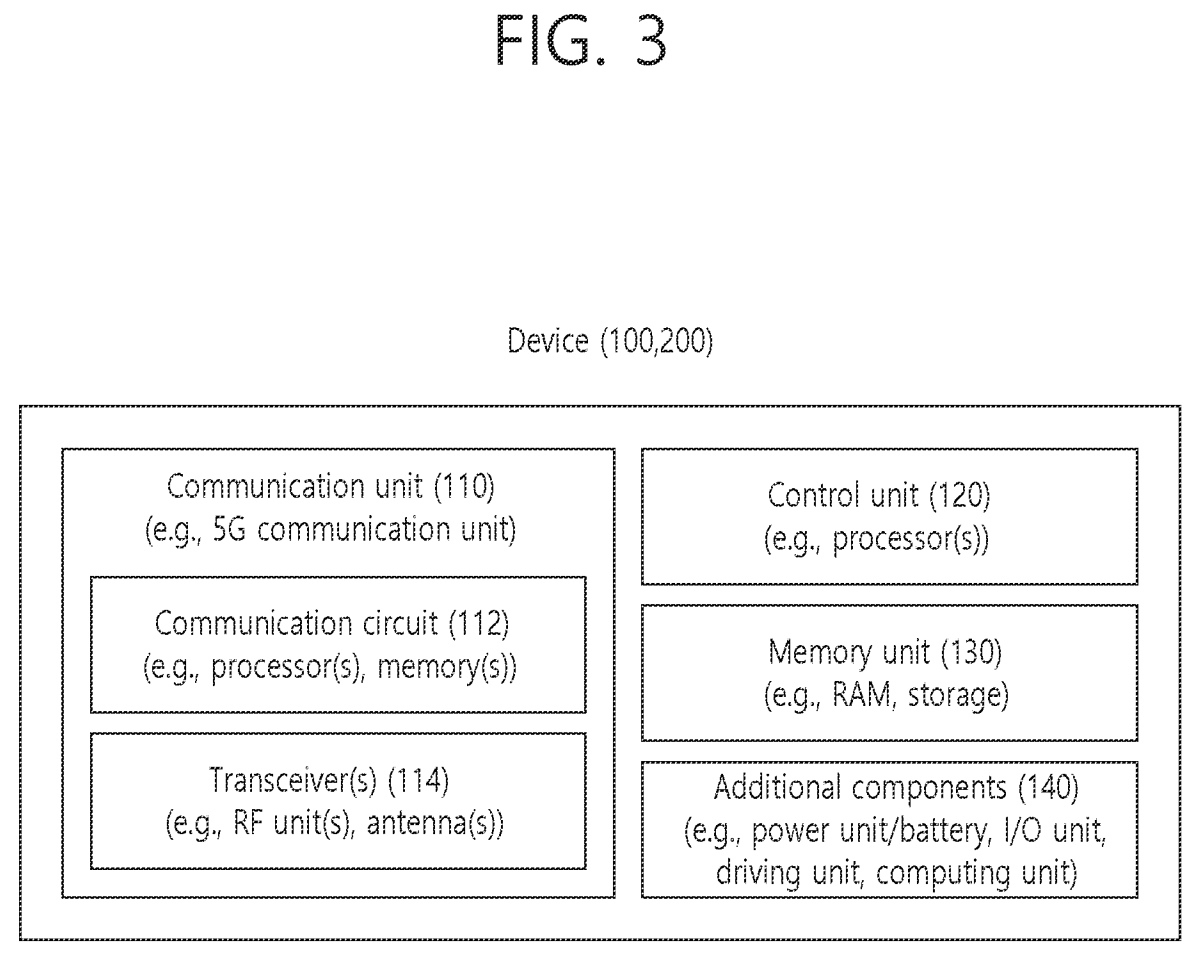

Device (100,200)

Communication unit (110)
(e.g., 5G communication unit)

Communication circuit (112)
(e.g., processor(s), memory(s))

Transceiver(s) (114)
(e.g., RF unit(s), antenna(s))

Control unit (120)
(e.g., processor(s))

Memory unit (130)
(e.g., RAM, storage)

Additional components (140)
(e.g., power unit/battery, I/O unit, driving unit, computing unit)

FIG. 13

Core Network
U
C/U
C/U
SCG Bearer
Split Bearer
MCG Bearer
PDCP
RLC
RLC
MAC
PHY
SN
1321
PDCP
PDCP
RLC
RLC
MAC
PHY
MN
1311
UE
1330

CONTROL OF RESOURCE UTILIZATION IN WIRELESS COMMUNICATION SYSTEM

CROSS-REFERENCE TO RELATED APPLICATIONS

This application is a National Stage application under 35 U.S.C. § 371 of International Application No. PCT/KR2022/011349, filed on Aug. 2, 2022, which claims the benefit of Korean Patent Application No. 10-2021-0102702, filed on Aug. 4, 2021. The disclosures of the prior applications are incorporated by reference in their entirety.

TECHNICAL FIELD

The present disclosure related to a control of resource utilization in wireless communications.

BACKGROUND ART

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

In wireless communications, a user equipment (UE) should be uplink-synchronized via a random access procedure, to perform uplink transmissions. The UE may be configured with cell-specific contention-based random access (CBRA) resources and/or UE-specific contention-free random access (CFRA) resources. The CFRA resources can be used for fast access to a network than the CFRA resources since CFRA procedure does not require contention resolution procedure, unlink CBRA procedure. However, since the CFRA resources are UE-specific resources that are dedicatedly configured to the UE and should be reserved for the UE, resources may sometimes be utilized inefficiently.

SUMMARY

An aspect of the present disclosure is to provide method and apparatus for a control of resource utilization in a wireless communication system.

Another aspect of the present disclosure is to provide method and apparatus for a control of CFRA resource utilization in a wireless communication system.

According to an embodiment of the present disclosure, a method performed by a user equipment (UE) in a wireless communication system comprises: receiving, from a network, a configuration of a first random access resource for a contention-based random access to a cell group; receiving, from the network, a configuration of a second random access resource for a contention-free random access to the cell group and validity information comprising a timer value related to a validity of the second random access resource; entering a first state for the cell group; starting a timer having a duration of the timer value after entering the first state for the cell group: selecting a random access resource for use in entering a second state for the cell group; and performing a random access procedure for the cell group based on the selected random access resource. The first random access resource is selected while the timer is not running. The second random access resource is selected while the timer is running. The first state is a state in which the UE monitors a first set of resources for a control channel on the cell group or does not monitor a control channel on the cell group. The second state is a state in which the UE monitors a second set of resources for a control channel on the cell group.

According to an embodiment of the present disclosure, a user equipment (UE) configured to operate in a wireless communication system comprises: at least one transceiver; at least processor; and at least one computer memory operably connectable to the at least one processor and storing instructions that, based on being executed by the at least one processor, perform operations comprising: receiving, from a network, a configuration of a first random access resource for a contention-based random access to a cell group; receiving, from the network, a configuration of a second random access resource for a contention-free random access to the cell group and validity information comprising a timer value related to a validity of the second random access resource; entering a first state for the cell group; starting a timer having a duration of the timer value after entering the first state for the cell group; selecting a random access resource for use in entering a second state for the cell group; and performing a random access procedure for the cell group based on the selected random access resource. The first random access resource is selected while the timer is not running. The second random access resource is selected while the timer is running. The first state is a state in which the UE monitors a first set of resources for a control channel on the cell group or does not monitor a control channel on the cell group. The second state is a state in which the UE monitors a second set of resources for a control channel on the cell group.

According to an embodiment of the present disclosure, at least one computer readable medium (CRM) stores instructions that, based on being executed by at least one processor, perform operations comprising: receiving, from a network, a configuration of a first random access resource for a contention-based random access to a cell group; receiving, from the network, a configuration of a second random access resource for a contention-free random access to the cell group and validity information comprising a timer value related to a validity of the second random access resource; entering a first state for the cell group; starting a timer having a duration of the timer value after entering the first state for the cell group; selecting a random access resource for use in entering a second state for the cell group; and performing a random access procedure for the cell group based on the selected random access resource. The first random access resource is selected while the timer is not running. The second random access resource is selected while the timer is running. The first state is a state in which the UE monitors a first set of resources for a control channel on the cell group or does not monitor a control channel on the cell group. The second state is a state in which the UE monitors a second set of resources for a control channel on the cell group.

According to an embodiment of the present disclosure, an apparatus configured to operate in a wireless communication system comprises: at least processor; and at least one computer memory operably connectable to the at least one processor, wherein the at least one processor is configured to perform operations comprising: receiving, from a network, a configuration of a first random access resource for a contention-based random access to a cell group; receiving, from the network, a configuration of a second random access resource for a contention-free random access to the cell group and validity information comprising a timer value related to a validity of the second random access resource; entering a first state for the cell group; starting a timer having a duration of the timer value after entering the first state for the cell group; selecting a random access resource for use in entering a second state for the cell group; and performing a random access procedure for the cell group based on the selected random access resource. The first random access resource is selected while the timer is not running. The second random access resource is selected while the timer is running. The first state is a state in which the UE monitors a first set of resources for a control channel on the cell group or does not monitor a control channel on the cell group. The second state is a state in which the UE monitors a second set of resources for a control channel on the cell group.

According to an embodiment of the present disclosure, a method performed by a network node related to a cell group configured to operate in a wireless communication system comprises: transmitting a configuration of a first random access resource for a contention-based random access to the cell group; transmitting a configuration of a second random access resource for a contention-free random access to the cell group and validity information comprising a timer value related to a validity of the second random access resource, wherein a timer having a duration of the timer value is started after entering a first state for the cell group; performing a random access procedure for the cell group based on a random access resource selected among the first random access resource and the second random access resource; and entering a second state for the cell group upon successfully completing the random access procedure for the cell group. The first random access resource is selected while the timer is not running. The second random access resource is selected while the timer is running. The first state is a state in which the UE monitors a first set of resources for a control channel on the cell group or does not monitor a control channel on the cell group. The second state is a state in which the UE monitors a second set of resources for a control channel on the cell group.

According to an embodiment of the present disclosure, a network node related to a cell group configured to operate in a wireless communication system comprises: at least one transceiver; at least processor; and at least one computer memory operably connectable to the at least one processor and storing instructions that, based on being executed by the at least one processor, perform operations comprising: transmitting a configuration of a first random access resource for a contention-based random access to the cell group; transmitting a configuration of a second random access resource for a contention-free random access to the cell group and validity information comprising a timer value related to a validity of the second random access resource, wherein a timer having a duration of the timer value is started after entering a first state for the cell group; performing a random access procedure for the cell group based on a random access resource selected among the first random access resource and the second random access resource; and entering a second state for the cell group upon successfully completing the random access procedure for the cell group. The first random access resource is selected while the timer is not running. The second random access resource is selected while the timer is running. The first state is a state in which the UE monitors a first set of resources for a control channel on the cell group or does not monitor a control channel on the cell group. The second state is a state in which the UE monitors a second set of resources for a control channel on the cell group.

The present disclosure can have various advantageous effects.

For example, network can efficiently utilize the RACH resources configured to a UE by opportunistically or exclusively reusing the resources for other UEs.

For example, fast SCG activation based on CFRA can be supported while the network re-allocates the CFRA resources being unused for more than a pre-defined time period to other UEs, so that the CFRA resources can be efficiently utilized.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

BRIEF DESCRIPTION OF THE DRAWINGS

FIG. 1 shows an example of a communication system to which implementations of the present disclosure is applied.

FIG. 3 shows an example of a wireless device to which implementations of the present disclosure is applied.

FIG. 13 shows an example of a dual connectivity (DC) architecture to which technical features of the present disclosure can be applied.

DETAILED DESCRIPTION

Figure 2:
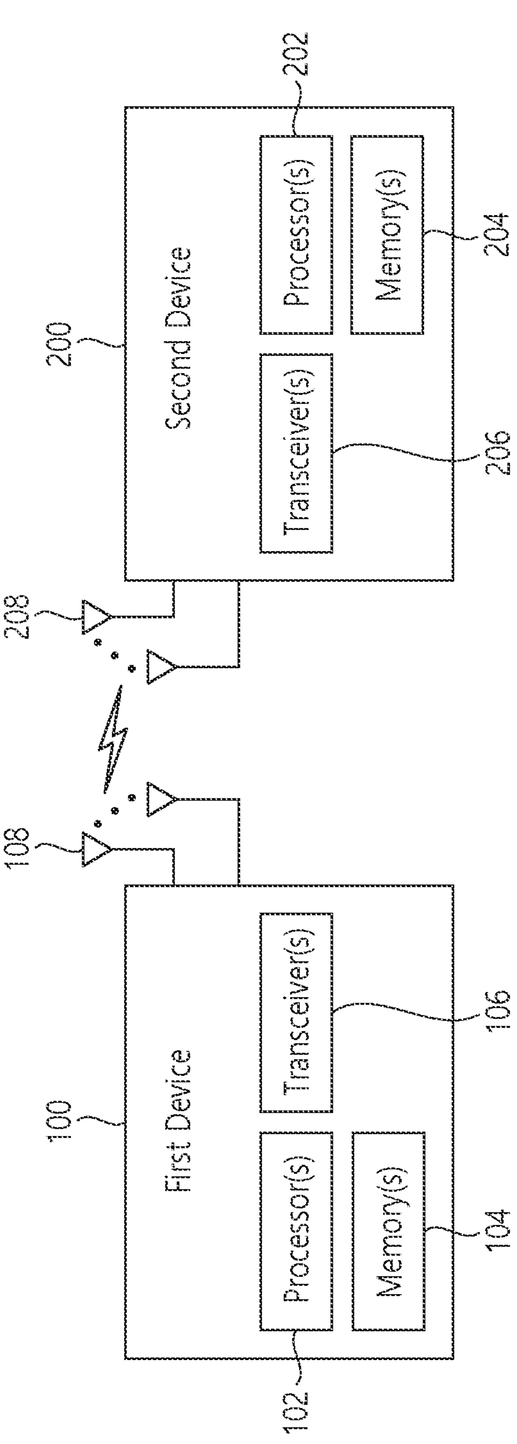
FIG. 2 shows an example of wireless devices to which implementations of the present disclosure is applied.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE.

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDCCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Throughout the disclosure, the terms 'radio access network (RAN) node'. 'base station', 'eNB', 'gNB' and 'cell' may be used interchangeably. Further, a UE may be a kind of a wireless device, and throughout the disclosure, the terms 'UE' and 'wireless device' may be used interchangeably.

Throughout the disclosure, the terms 'cell quality', 'signal strength', 'signal quality'. 'channel state', 'channel quality', 'channel state/reference signal received power (RSRP)' and' reference signal received quality (RSRQ)' may be used interchangeably.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

FIG. 1 shows an example of a communication system to which implementations of the present disclosure is applied.

The 5G usage scenarios shown in FIG. 1 are only exemplary, and the technical features of the present disclosure can be applied to other 5G usage scenarios which are not shown in FIG. 1.

Three main requirement categories for 5G include (1) a category of enhanced mobile broadband (eMBB), (2) a category of massive machine type communication (mMTC), and (3) a category of ultra-reliable and low latency communications (URLLC).

Partial use cases may require a plurality of categories for optimization and other use cases may focus only upon one key performance indicator (KPI). 5G supports such various use cases using a flexible and reliable method.

eMBB far surpasses basic mobile Internet access and covers abundant bidirectional work and media and entertainment applications in cloud and augmented reality. Data is one of 5G core motive forces and, in a 5G era, a dedicated voice service may not be provided for the first time. In 5G, it is expected that voice will be simply processed as an application program using data connection provided by a communication system. Main causes for increased traffic volume are due to an increase in the size of content and an increase in the number of applications requiring high data transmission rate. A streaming service (of audio and video), conversational video, and mobile Internet access will be more widely used as more devices are connected to the Internet. These many application programs require connectivity of an always turned-on state in order to push real-time information and alarm for users. Cloud storage and applications are rapidly increasing in a mobile communication platform and may be applied to both work and entertainment. The cloud storage is a special use case which accelerates growth of uplink data transmission rate. 5G is also used for remote work of cloud. When a tactile interface is used, 5G demands much lower end-to-end latency to maintain user good experience. Entertainment, for example, cloud gaming and video streaming, is another core element which increases demand for mobile broadband capability. Entertainment is essential for a smartphone and a tablet in any place including high mobility environments such as a train, a vehicle, and an airplane. Other use cases are augmented reality for entertainment and information search. In this case, the augmented reality requires very low latency and instantaneous data volume.

In addition, one of the most expected 5G use cases relates a function capable of smoothly connecting embedded sensors in all fields, i.e., mMTC. It is expected that the number of potential Internet-of-things (IoT) devices will reach 204 hundred million up to the year of 2020. An industrial IoT is one of categories of performing a main role enabling a smart city, asset tracking, smart utility, agriculture, and security infrastructure through 5G.

URLLC includes a new service that will change industry through remote control of main infrastructure and an ultra-reliable/available low-latency link such as a self-driving vehicle. A level of reliability and latency is essential to control a smart grid, automatize industry, achieve robotics, and control and adjust a drone.

5G is a means of providing streaming evaluated as a few hundred megabits per second to gigabits per second and may complement fiber-to-the-home (FTTH) and cable-based broadband (or DOCSIS). Such fast speed is needed to deliver TV in resolution of 4K or more (6K, 8K, and more), as well as virtual reality and augmented reality. Virtual reality (VR) and augmented reality (AR) applications include almost immersive sports games. A specific application program may require a special network configuration. For example, for VR games, gaming companies need to incorporate a core server into an edge network server of a network operator in order to minimize latency.

Automotive is expected to be a new important motivated force in 5G together with many use cases for mobile communication for vehicles. For example, entertainment for passengers requires high simultaneous capacity and mobile broadband with high mobility. This is because future users continue to expect connection of high quality regardless of their locations and speeds. Another use case of an automotive field is an AR dashboard. The AR dashboard causes a driver to identify an object in the dark in addition to an object seen from a front window and displays a distance from the object and a movement of the object by overlapping information talking to the driver. In the future, a wireless module enables communication between vehicles, information exchange between a vehicle and supporting infrastructure, and information exchange between a vehicle and other connected devices (e.g., devices accompanied by a pedestrian). A safety system guides alternative courses of a behavior so that a driver may drive more safely drive, thereby lowering the danger of an accident. The next stage will be a remotely controlled or self-driven vehicle. This requires very high reliability and very fast communication between different self-driven vehicles and between a vehicle and infrastructure. In the future, a self-driven vehicle will perform all driving activities and a driver will focus only upon abnormal traffic that the vehicle cannot identify. Technical requirements of a self-driven vehicle demand ultra-low latency and ultra-high reliability so that traffic safety is increased to a level that cannot be achieved by human being.

A smart city and a smart home/building mentioned as a smart society will be embedded in a high-density wireless sensor network. A distributed network of an intelligent sensor will identify conditions for costs and energy-efficient maintenance of a city or a home. Similar configurations may be performed for respective households. All of temperature sensors, window and heating controllers, burglar alarms, and home appliances are wirelessly connected. Many of these sensors are typically low in data transmission rate, power, and cost. However, real-time HD video may be demanded by a specific type of device to perform monitoring.

Consumption and distribution of energy including heat or gas is distributed at a higher level so that automated control of the distribution sensor network is demanded. The smart grid collects information and connects the sensors to each other using digital information and communication technology so as to act according to the collected information. Since this information may include behaviors of a supply company and a consumer, the smart grid may improve distribution of fuels such as electricity by a method having efficiency, reliability, economic feasibility, production sustainability, and automation. The smart grid may also be regarded as another sensor network having low latency.

Mission critical application (e.g., e-health) is one of 5G use scenarios. A health part contains many application programs capable of enjoying benefit of mobile communication. A communication system may support remote treatment that provides clinical treatment in a faraway place. Remote treatment may aid in reducing a barrier against distance and improve access to medical services that cannot be continuously available in a faraway rural area. Remote treatment is also used to perform important treatment and save lives in an emergency situation. The wireless sensor network based on mobile communication may provide remote monitoring and sensors for parameters such as heart rate and blood pressure.

Wireless and mobile communication gradually becomes important in the field of an industrial application. Wiring is high in installation and maintenance cost. Therefore, a possibility of replacing a cable with reconstructible wireless links is an attractive opportunity in many industrial fields. However, in order to achieve this replacement, it is necessary for wireless connection to be established with latency, reliability, and capacity similar to those of the cable and management of wireless connection needs to be simplified. Low latency and a very low error probability are new requirements when connection to 5G is needed.

Logistics and freight tracking are important use cases for mobile communication that enables inventory and package tracking anywhere using a location-based information system. The use cases of logistics and freight typically demand low data rate but require location information with a wide range and reliability.

Referring to FIG. 1, the communication system 1 includes wireless devices 100*a* to 100*f*, base stations (BSs) 200, and a network 300. Although FIG. 1 illustrates a 5G network as an example of the network of the communication system 1, the implementations of the present disclosure are not limited to the 5G system, and can be applied to the future communication system beyond the 5G system.

The BSs 200 and the network 300 may be implemented as wireless devices and a specific wireless device may operate as a BS/network node with respect to other wireless devices.

The wireless devices 100*a* to 100*f* represent devices performing communication using radio access technology (RAT) (e.g., 5G new RAT (NR)) or LTE) and may be referred to as communication/radio/5G devices. The wireless devices 100*a* to 100*f* may include, without being limited to, a robot 100*a*, vehicles 100*b*-1 and 100*b*-2, an extended reality (XR) device 100*c*, a hand-held device 100*d*, a home appliance 100*e*, an IoT device 100*f*, and an artificial intelligence (AI) device/server 400. For example, the vehicles may include a vehicle having a wireless communication function, an autonomous driving vehicle, and a vehicle capable of performing communication between vehicles. The vehicles may include an unmanned aerial vehicle (UAV) (e.g., a drone). The XR device may include an AR/VR/Mixed Reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100*a* to 100*f* may be called user equipments (UEs). A UE may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a vehicle, a vehicle having an autonomous traveling function, a connected car, an UAV, an AI module, a robot, an AR device, a VR device, an MR device, a hologram device, a public safety device, an MTC device, an IoT device, a medical device, a FinTech device (or a financial device), a security device, a weather/environment device, a device related to a 5G service, or a device related to a fourth industrial revolution field.

The UAV may be, for example, an aircraft aviated by a wireless control signal without a human being onboard.

The VR device may include, for example, a device for implementing an object or a background of the virtual world. The AR device may include, for example, a device implemented by connecting an object or a background of the virtual world to an object or a background of the real world. The MR device may include, for example, a device implemented by merging an object or a background of the virtual world into an object or a background of the real world. The hologram device may include, for example, a device for implementing a stereoscopic image of 360 degrees by recording and reproducing stereoscopic information, using an interference phenomenon of light generated when two laser lights called holography meet.

The public safety device may include, for example, an image relay device or an image device that is wearable on the body of a user.

The MTC device and the IoT device may be, for example, devices that do not require direct human intervention or manipulation. For example, the MTC device and the IoT device may include smartmeters, vending machines, thermometers, smartbulbs, door locks, or various sensors.

Here, the radio communication technologies implemented in the wireless devices in the present disclosure may include narrowband internet-of-things (NB-IoT) technology for low-power communication as well as LTE, NR and 6G. For example, NB-IoT technology may be an example of low power wide area network (LPWAN) technology, may be implemented in specifications such as LTE Cat NB1 and/or LTE Cat NB2, and may not be limited to the above-mentioned names. Additionally and/or alternatively, the radio communication technologies implemented in the wireless devices in the present disclosure may communicate based on LTE-M technology. For example, LTE-M technology may be an example of LPWAN technology and be called by various names such as enhanced machine type communication (eMTC). For example, LTE-M technology may be implemented in at least one of the various specifications, such as 1) LTE Cat 0, 2) LTE Cat M1, 3) LTE Cat M2, 4) LTE non-bandwidth limited (non-BL), 5) LTE-MTC, 6) LTE Machine Type Communication, and/or 7) LTE M, and may not be limited to the above-mentioned names. Additionally and/or alternatively, the radio communication technologies implemented in the wireless devices in the present disclosure may include at least one of ZigBee, Bluetooth, and/or LPWAN which take into account low-power communication, and may not be limited to the above-mentioned names. For example, ZigBee technology may generate personal area networks (PANs) associated with small/low-power digital communication based on various specifications such as IEEE 802.15.4 and may be called various names.

The medical device may be, for example, a device used for the purpose of diagnosing, treating, relieving, curing, or preventing disease. For example, the medical device may be a device used for the purpose of diagnosing, treating, relieving, or correcting injury or impairment. For example, the medical device may be a device used for the purpose of inspecting, replacing, or modifying a structure or a function. For example, the medical device may be a device used for the purpose of adjusting pregnancy. For example, the medical device may include a device for treatment, a device for operation, a device for (in vitro) diagnosis, a hearing aid, or a device for procedure.

The security device may be, for example, a device installed to prevent a danger that may arise and to maintain safety. For example, the security device may be a camera, a closed-circuit TV (CCTV), a recorder, or a black box.

The FinTech device may be, for example, a device capable of providing a financial service such as mobile payment. For example, the FinTech device may include a payment device or a point of sales (POS) system.

The weather/environment device may include, for example, a device for monitoring or predicting a weather/environment.

The wireless devices 100*a* to 100*f* may be connected to the network 300 via the BSs 200. An AI technology may be applied to the wireless devices 100*a* to 100*f* and the wireless devices 100*a* to 100*f* may be connected to the AI server 400 via the network 300. The network 300 may be configured using a 3G network, a 4G (e.g., LTE) network, a 5G (e.g., NR) network, and a beyond-5G network. Although the wireless devices 100*a* to 100*f* may communicate with each other through the BSs 200/network 300, the wireless devices 100*a* to 100*f* may perform direct communication (e.g., sidelink communication) with each other without passing through the BSs 200/network 300. For example, the vehicles 100*b*-1 and 100*b*-2 may perform direct communication (e.g., vehicle-to-vehicle (V2V)/vehicle-to-everything (V2X) communication). The IoT device (e.g., a sensor) may perform direct communication with other IoT devices (e.g., sensors) or other wireless devices 100*a* to 100*f*.

Wireless communication/connections 150*a*. 150*b* and 150*c* may be established between the wireless devices 100*a* to 100*f* and/or between wireless device 100*a* to 100*f* and BS 200 and/or between BSs 200. Herein, the wireless communication/connections may be established through various RATs (e.g., 5G NR) such as uplink/downlink communication 150*a*, sidelink communication (or device-to-device (D2D) communication) 150*b*, inter-base station communication 150*c* (e.g., relay, integrated access and backhaul (IAB)), etc. The wireless devices 100*a* to 100*f* and the BSs 200/the wireless devices 100*a* to 100*f* may transmit/receive radio signals to/from each other through the wireless communication/connections 150*a*, 150*b* and 150*c*. For example, the wireless communication/connections 150*a*. 150*b* and 150*c* may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

FIG. 2 shows an example of wireless devices to which implementations of the present disclosure is applied.

Referring to FIG. 2, a first wireless device 100 and a second wireless device 200 may transmit/receive radio signals to/from an external device through a variety of RATs (e.g., LTE and NR). In FIG. 2, {the first wireless device 100 and the second wireless device 200} may correspond to at least one of {the wireless device 100*a* to 100*f* and the BS 200}, {the wireless device 100*a* to 100*f* and the wireless device 100*a* to 100*f*} and/or {the BS 200 and the BS 200} of FIG. 1.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, suggestions, methods and/or operational flowcharts described in the present disclosure. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver(s) 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, suggestions, methods and/or operational flowcharts described in the present disclosure. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with radio frequency (RF) unit(s). In the present disclosure, the first wireless device 100 may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, suggestions, methods and/or operational flowcharts described in the present disclosure. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, suggestions, methods and/or operational flowcharts described in the present disclosure. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the second wireless device 200 may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as physical (PHY) layer, media access control (MAC) layer, radio link control (RLC) layer, packet data convergence protocol (PDCP) layer, radio resource control (RRC) layer, and service data adaptation protocol (SDAP) layer). The one or more processors 102 and 202 may generate one or more protocol data units (PDUs) and/or one or more service data unit (SDUs) according to the descriptions, functions, procedures, suggestions, methods and/or operational flowcharts disclosed in the present disclosure. The one or more processors 102 and 202 may generate messages, control information, data, or information according to the descriptions, functions, procedures, suggestions, methods and/or operational flowcharts disclosed in the present disclosure. The one or more processors 102 and 202 may generate signals (e.g., baseband signals) including PDUs, SDUs, messages, control information, data, or information according to the descriptions, functions, procedures, suggestions, methods and/or operational flowcharts disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, suggestions, methods and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202, descriptions, functions, procedures, suggestions, methods and/or operational flowcharts disclosed in the present disclosure may be implemented using firmware or software and the firmware or software may be configured to include the modules, procedures, or functions. Firmware or software configured to perform the descriptions, functions, procedures, suggestions, methods and/or operational flowcharts disclosed in the present disclosure may be included in the one or more processors 102 and 202 or stored in the one or more memories 104 and 204 so as to be driven by the one or more processors 102 and 202. The descriptions, functions, procedures, suggestions, methods and/or operational flowcharts disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the descriptions, functions, procedures, suggestions, methods and/or operational flowcharts disclosed in the present disclosure, to one or more other devices. The one or more transceivers 106 and 206 may receive user data, control information, and/or radio signals/channels, mentioned in the descriptions, functions, procedures, suggestions, methods and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices.

The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, suggestions, methods and/or operational flowcharts disclosed in the present disclosure, through the one or more antennas 108 and 208. In the present disclosure, the one or more antennas may be a plurality of physical antennas or a plurality of logical antennas (e.g., antenna ports).

The one or more transceivers 106 and 206 may convert received radio signals/channels, etc., from RF band signals into baseband signals in order to process received user data, control information, radio signals/channels, etc., using the one or more processors 102 and 202. The one or more transceivers 106 and 206 may convert the user data, control information, radio signals/channels, etc., processed using the one or more processors 102 and 202 from the base band signals into the RF band signals. To this end, the one or more transceivers 106 and 206 may include (analog) oscillators and/or filters. For example, the transceivers 106 and 206 can up-convert OFDM baseband signals to a carrier frequency by their (analog) oscillators and/or filters under the control of the processors 102 and 202 and transmit the up-converted OFDM signals at the carrier frequency. The transceivers 106 and 206 may receive OFDM signals at a carrier frequency and down-convert the OFDM signals into OFDM baseband signals by their (analog) oscillators and/or filters under the control of the transceivers 102 and 202.

In the implementations of the present disclosure, a UE may operate as a transmitting device in uplink (UL) and as a receiving device in downlink (DL). In the implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS. For example, the processor(s) 102 connected to, mounted on or launched in the first wireless device 100 may be configured to perform the UE behavior according to an implementation of the present disclosure or control the transceiver(s) 106 to perform the UE behavior according to an implementation of the present disclosure. The processor(s) 202 connected to, mounted on or launched in the second wireless device 200 may be configured to perform the BS behavior according to an implementation of the present disclosure or control the transceiver(s) 206 to perform the BS behavior according to an implementation of the present disclosure.

In the present disclosure, a BS is also referred to as a node B (NB), an eNode B (eNB), or a gNB.

FIG. 3 shows an example of a wireless device to which implementations of the present disclosure is applied.

The wireless device may be implemented in various forms according to a use-case/service (refer to FIG. 1).

Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 of FIG. 2 and/or the one or more memories 104 and 204 of FIG. 2. For example, the transceiver(s) 114 may include the one or more transceivers 106 and 206 of FIG. 2 and/or the one or more antennas 108 and 208 of FIG. 2. The control unit 120 is electrically connected to the communication unit 110, the memory 130, and the additional components 140 and controls overall operation of each of the wireless devices 100 and 200. For example, the control unit 120 may control an electric/mechanical operation of each of the wireless devices 100 and 200 based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of the wireless devices 100 and 200. For example, the additional components 140 may include at least one of a power unit/battery, input/output (I/O) unit (e.g., audio 1/O port, video 1/O port), a driving unit, and a computing unit. The wireless devices 100 and 200 may be implemented in the form of, without being limited to, the robot (100*a* of FIG. 1), the vehicles (100*b*-1 and 100*b*-2 of FIG. 1), the XR device (100*c* of FIG. 1), the hand-held device (100*d* of FIG. 1), the home appliance (100*e* of FIG. 1), the IoT device (100*f* of FIG. 1), a digital broadcast terminal, a hologram device, a public safety device, an MTC device, a medicine device, a FinTech device (or a finance device), a security device, a climate/environment device, the AI server/device (400 of FIG. 1), the BSs (200 of FIG. 1), a network node, etc. The wireless devices 100 and 200 may be used in a mobile or fixed place according to a use—example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor (AP), an electronic control unit (ECU), a graphical processing unit, and a memory control processor. As another example, the memory 130 may be configured by a RAM, a DRAM, a ROM, a flash memory, a volatile memory, a non-volatile memory, and/or a combination thereof.

Figure 4:
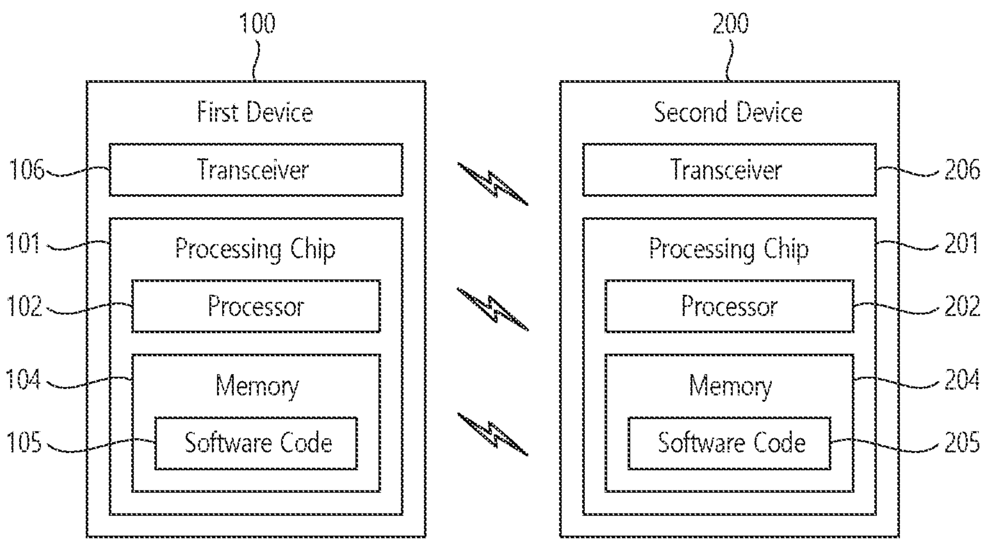
FIG. 4 shows another example of wireless devices to which implementations of the present disclosure is applied.

FIG. 4 shows another example of wireless devices to which implementations of the present disclosure is applied.

Referring to FIG. 4, wireless devices 100 and 200 may correspond to the wireless devices 100 and 200 of FIG. 2 and may be configured by various elements, components, units/portions, and/or modules.

The first wireless device 100 may include at least one transceiver, such as a transceiver 106, and at least one processing chip, such as a processing chip 101. The processing chip 101 may include at least one processor, such a processor 102, and at least one memory, such as a memory 104. The memory 104 may be operably connectable to the processor 102. The memory 104 may store various types of information and/or instructions. The memory 104 may store a software code 105 which implements instructions that, when executed by the processor 102, perform the descriptions, functions, procedures, suggestions, methods and/or operational flowcharts disclosed in the present disclosure. For example, the software code 105 may implement instructions that, when executed by the processor 102, perform the descriptions, functions, procedures, suggestions, methods and/or operational flowcharts disclosed in the present disclosure. For example, the software code 105 may control the processor 102 to perform one or more protocols. For example, the software code 105 may control the processor 102 may perform one or more layers of the radio interface protocol.

The second wireless device 200 may include at least one transceiver, such as a transceiver 206, and at least one processing chip, such as a processing chip 201. The processing chip 201 may include at least one processor, such a processor 202, and at least one memory, such as a memory 204. The memory 204 may be operably connectable to the processor 202. The memory 204 may store various types of information and/or instructions. The memory 204 may store a software code 205 which implements instructions that, when executed by the processor 202, perform the descriptions, functions, procedures, suggestions, methods and/or operational flowcharts disclosed in the present disclosure. For example, the software code 205 may implement instructions that, when executed by the processor 202, perform the descriptions, functions, procedures, suggestions, methods and/or operational flowcharts disclosed in the present disclosure. For example, the software code 205 may control the processor 202 to perform one or more protocols. For example, the software code 205 may control the processor 202 may perform one or more layers of the radio interface protocol.

Figure 5:
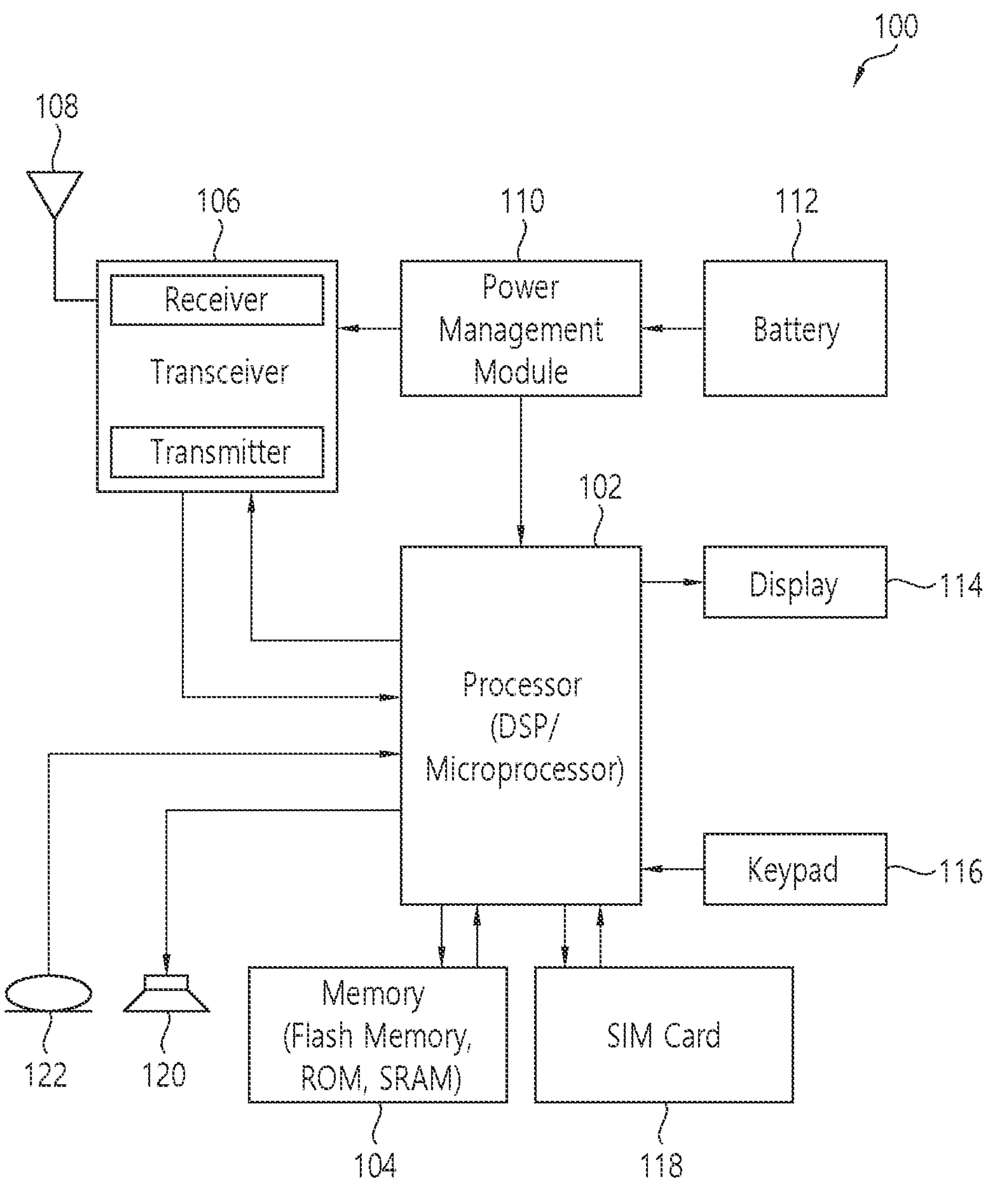
FIG. 5 shows an example of UE to which implementations of the present disclosure is applied.

FIG. 5 shows an example of UE to which implementations of the present disclosure is applied.

Referring to FIG. 5, a UE 100 may correspond to the first wireless device 100 of FIG. 2 and/or the first wireless device 100 of FIG. 4.

A UE 100 includes a processor 102, a memory 104, a transceiver 106, one or more antennas 108, a power management module 110, a battery 1112, a display 114, a keypad 116, a subscriber identification module (SIM) card 118, a speaker 120, and a microphone 122.

The processor 102 may be configured to implement the descriptions, functions, procedures, suggestions, methods and/or operational flowcharts disclosed in the present disclosure. The processor 102 may be configured to control one or more other components of the UE 100 to implement the descriptions, functions, procedures, suggestions, methods and/or operational flowcharts disclosed in the present disclosure. Layers of the radio interface protocol may be implemented in the processor 102. The processor 102 may include ASIC, other chipset, logic circuit and/or data processing device. The processor 102 may be an application processor. The processor 102 may include at least one of a digital signal processor (DSP), a central processing unit (CPU), a graphics processing unit (GPU), a modem (modulator and demodulator). An example of the processor 102 may be found in SNAPDRAGON™ series of processors made by Qualcomm®. EXYNOS™ series of processors made by Samsung®, A series of processors made by Apple®, HELIO™ series of processors made by MediaTek®, ATOM™ series of processors made by Intel® or a corresponding next generation processor.

The memory 104 is operatively coupled with the processor 102 and stores a variety of information to operate the processor 102. The memory 104 may include ROM, RAM, flash memory, memory card, storage medium and/or other storage device. When the embodiments are implemented in software, the techniques described herein can be implemented with modules (e.g., procedures, functions, etc.) that perform the descriptions, functions, procedures, suggestions, methods and/or operational flowcharts disclosed in the present disclosure. The modules can be stored in the memory 104 and executed by the processor 102. The memory 104 can be implemented within the processor 102 or external to the processor 102 in which case those can be communicatively coupled to the processor 102 via various means as is known in the art.

The transceiver 106 is operatively coupled with the processor 102, and transmits and/or receives a radio signal. The transceiver 106 includes a transmitter and a receiver. The transceiver 106 may include baseband circuitry to process radio frequency signals. The transceiver 106 controls the one or more antennas 108 to transmit and/or receive a radio signal.

The power management module 110 manages power for the processor 102 and/or the transceiver 106. The battery 112 supplies power to the power management module 110.

The display 114 outputs results processed by the processor 102. The keypad 116 receives inputs to be used by the processor 102. The keypad 16 may be shown on the display 114.

The SIM card 118 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The speaker 120 outputs sound-related results processed by the processor 102. The microphone 122 receives sound-related inputs to be used by the processor 102.

Figure 6:
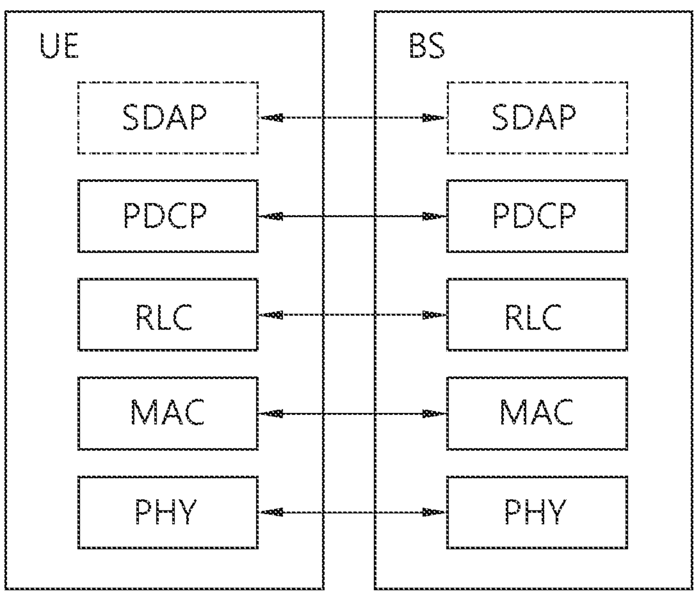
FIGS. 6 and 7 show an example of protocol stacks in a 3GPP based wireless communication system to which implementations of the present disclosure is applied.
Figure 7:
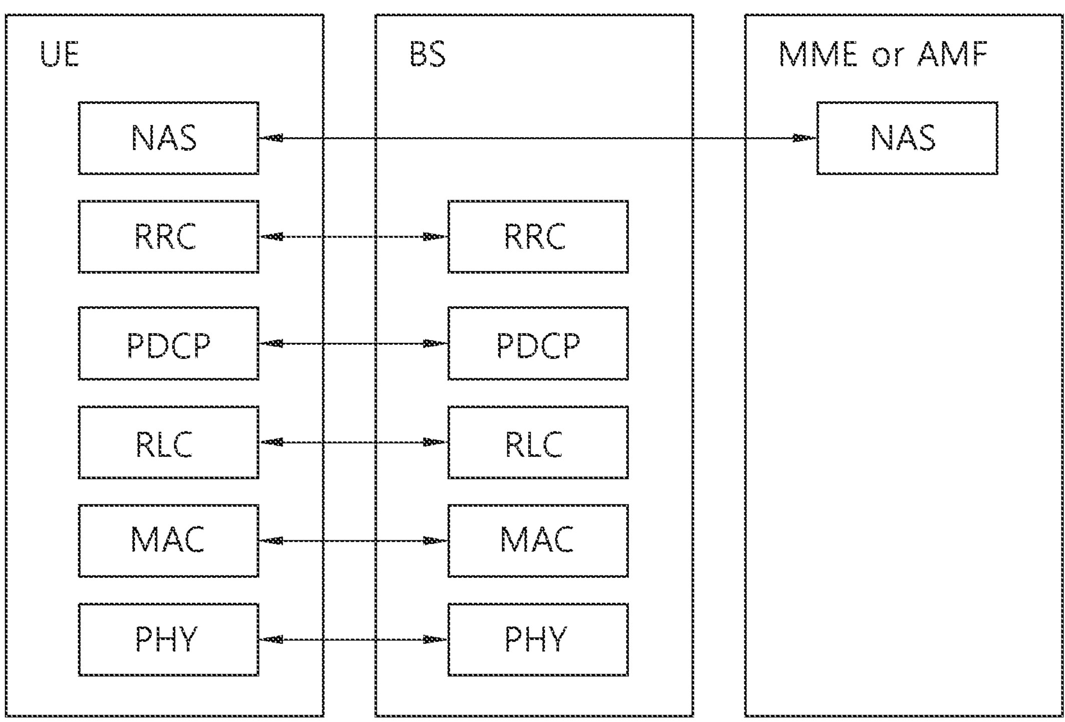

FIGS. 6 and 7 show an example of protocol stacks in a 3GPP based wireless communication system to which implementations of the present disclosure is applied.

In particular, FIG. 6 illustrates an example of a radio interface user plane protocol stack between a UE and a BS and FIG. 7 illustrates an example of a radio interface control plane protocol stack between a UE and a BS. The control plane refers to a path through which control messages used to manage call by a UE and a network are transported. The user plane refers to a path through which data generated in an application layer, for example, voice data or Internet packet data are transported. Referring to FIG. 6, the user plane protocol stack may be divided into Layer 1 (i.e., a PHY layer) and Layer 2. Referring to FIG. 7, the control plane protocol stack may be divided into Layer 1 (i.e., a PHY layer), Layer 2, Layer 3 (e.g., an RRC layer), and a non-access stratum (NAS) layer. Layer 1, Layer 2 and Layer 3 are referred to as an access stratum (AS).

In the 3GPP LTE system, the Layer 2 is split into the following sublayers: MAC, RLC, and PDCP. In the 3GPP NR system, the Layer 2 is split into the following sublayers: MAC, RLC, PDCP and SDAP. The PHY layer offers to the MAC sublayer transport channels, the MAC sublayer offers to the RLC sublayer logical channels, the RLC sublayer offers to the PDCP sublayer RLC channels, the PDCP sublayer offers to the SDAP sublayer radio bearers. The SDAP sublayer offers to 5G core network quality of service (QoS) flows.

In the 3GPP NR system, the main services and functions of the MAC sublayer include: mapping between logical channels and transport channels; multiplexing/de-multiplexing of MAC SDUs belonging to one or different logical channels into/from transport blocks (TB) delivered to/from the physical layer on transport channels; scheduling information reporting; error correction through hybrid automatic repeat request (HARQ) (one HARQ entity per cell in case of carrier aggregation (CA)); priority handling between UEs by means of dynamic scheduling; priority handling between logical channels of one UE by means of logical channel prioritization; padding. A single MAC entity may support multiple numerologies, transmission timings and cells. Mapping restrictions in logical channel prioritization control which numerology(ies), cell(s), and transmission timing(s) a logical channel can use.

Different kinds of data transfer services are offered by MAC. To accommodate different kinds of data transfer services, multiple types of logical channels are defined, i.e., each supporting transfer of a particular type of information. Each logical channel type is defined by what type of information is transferred. Logical channels are classified into two groups: control channels and traffic channels. Control channels are used for the transfer of control plane information only, and traffic channels are used for the transfer of user plane information only. Broadcast control channel (BCCH) is a downlink logical channel for broadcasting system control information, paging control channel (PCCH) is a downlink logical channel that transfers paging information, system information change notifications and indications of ongoing public warning service (PWS) broadcasts, common control channel (CCCH) is a logical channel for transmitting control information between UEs and network and used for UEs having no RRC connection with the network, and dedicated control channel (DCCH) is a point-to-point bi-directional logical channel that transmits dedicated control information between a UE and the network and used by UEs having an RRC connection. Dedicated traffic channel (DTCH) is a point-to-point logical channel, dedicated to one UE, for the transfer of user information. A DTCH can exist in both uplink and downlink. In downlink, the following connections between logical channels and transport channels exist: BCCH can be mapped to broadcast channel (BCH); BCCH can be mapped to downlink shared channel (DL-SCH); PCCH can be mapped to paging channel (PCH); CCCH can be mapped to DL-SCH; DCCH can be mapped to DL-SCH; and DTCH can be mapped to DL-SCH. In uplink, the following connections between logical channels and transport channels exist: CCCH can be mapped to uplink shared channel (UL-SCH); DCCH can be mapped to UL-SCH; and DTCH can be mapped to UL-SCH.

The RLC sublayer supports three transmission modes: transparent mode (TM), unacknowledged mode (UM), and acknowledged node (AM). The RLC configuration is per logical channel with no dependency on numerologies and/or transmission durations. In the 3GPP NR system, the main services and functions of the RLC sublayer depend on the transmission mode and include: transfer of upper layer PDUs; sequence numbering independent of the one in PDCP (UM and AM); error correction through ARQ (AM only); segmentation (AM and UM) and re-segmentation (AM only) of RLC SDUs; reassembly of SDU (AM and UM); duplicate detection (AM only); RLC SDU discard (AM and UM); RLC re-establishment; protocol error detection (AM only).

In the 3GPP NR system, the main services and functions of the PDCP sublayer for the user plane include: sequence numbering; header compression and decompression using robust header compression (ROHC); transfer of user data; reordering and duplicate detection; in-order delivery; PDCP PDU routing (in case of split bearers); retransmission of PDCP SDUs; ciphering, deciphering and integrity protection; PDCP SDU discard; PDCP re-establishment and data recovery for RLC AM; PDCP status reporting for RLC AM; duplication of PDCP PDUs and duplicate discard indication to lower layers. The main services and functions of the PDCP sublayer for the control plane include: sequence numbering; ciphering, deciphering and integrity protection; transfer of control plane data; reordering and duplicate detection; in-order delivery; duplication of PDCP PDUs and duplicate discard indication to lower layers.

In the 3GPP NR system, the main services and functions of SDAP include: mapping between a QoS flow and a data radio bearer; marking QoS flow ID (QFI) in both DL and UL packets. A single protocol entity of SDAP is configured for each individual PDU session.

In the 3GPP NR system, the main services and functions of the RRC sublayer include: broadcast of system information related to AS and NAS; paging initiated by 5GC or NG-RAN; establishment, maintenance and release of an RRC connection between the UE and NG-RAN; security functions including key management; establishment, configuration, maintenance and release of signaling radio bearers (SRBs) and data radio bearers (DRBs); mobility functions (including: handover and context transfer, UE cell selection and reselection and control of cell selection and reselection, inter-RAT mobility); QoS management functions; UE measurement reporting and control of the reporting; detection of and recovery from radio link failure; NAS message transfer to/from NAS from/to UE.

Figure 8:
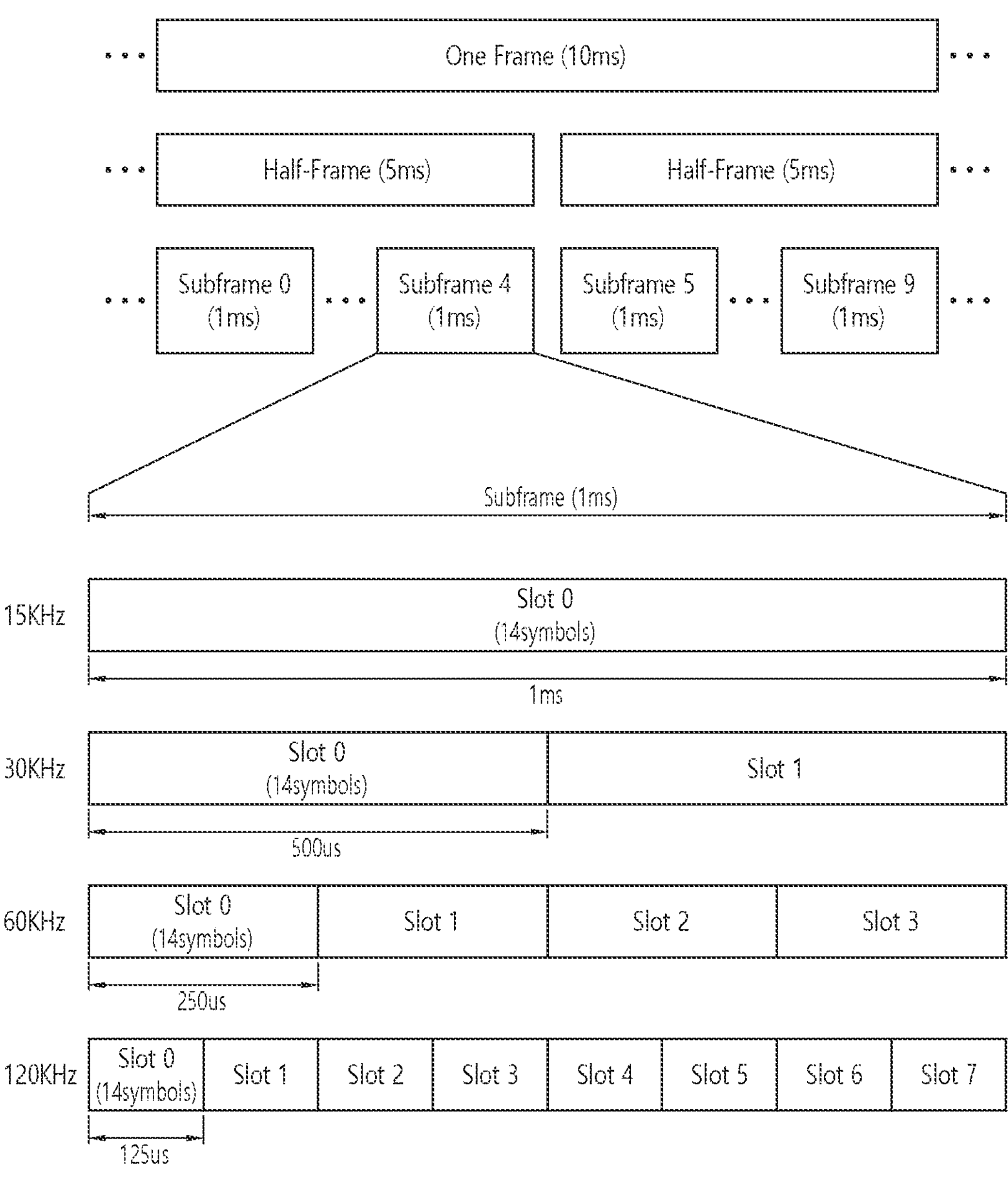
FIG. 8 shows a frame structure in a 3GPP based wireless communication system to which implementations of the present disclosure is applied.

FIG. 8 shows a frame structure in a 3GPP based wireless communication system to which implementations of the present disclosure is applied.

The frame structure shown in FIG. 8 is purely exemplary and the number of subframes, the number of slots, and/or the number of symbols in a frame may be variously changed. In the 3GPP based wireless communication system, OFDM numerologies (e.g., subcarrier spacing (SCS), transmission time interval (TTI) duration) may be differently configured between a plurality of cells aggregated for one UE. For example, if a UE is configured with different SCSs for cells aggregated for the cell, an (absolute time) duration of a time resource (e.g., a subframe, a slot, or a TTI) including the same number of symbols may be different among the aggregated cells. Herein, symbols may include OFDM symbols (or CP-OFDM symbols), SC-FDMA symbols (or discrete Fourier transform-spread-OFDM (DFT-s-OFDM) symbols).

Referring to FIG. 8, downlink and uplink transmissions are organized into frames. Each frame has $T_f$=10 ms duration. Each frame is divided into two half-frames, where each of the half-frames has 5 ms duration. Each half-frame consists of 5 subframes, where the duration $T_{sf}$ per subframe is 1 ms. Each subframe is divided into slots and the number of slots in a subframe depends on a subcarrier spacing. Each slot includes 14 or 12 OFDM symbols based on a cyclic prefix (CP). In a normal CP, each slot includes 14 OFDM symbols and, in an extended CP, each slot includes 12 OFDM symbols. The numerology is based on exponentially scalable subcarrier spacing $\beta f=2^u*15$ kHz.

Table 1 shows the number of OFDM symbols per slot $N^{slot}_{symb}$, the number of slots per frame $N^{frame,u}_{slot}$, and the number of slots per subframe $N^{subframe,u}_{slot}$ for the normal CP, according to the subcarrier spacing $\beta f=2^u*15$ kHz.

TABLE 1

| u | $N^{slot}_{symb}$ | $N^{frame,u}_{slot}$ | $N^{subframe,u}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Table 2 shows the number of OFDM symbols per slot $N^{slot}_{symb}$, the number of slots per frame $N^{frame,u}_{slot}$, and the number of slots per subframe $N^{subframe,u}_{slot}$ for the extended CP, according to the subcarrier spacing $\beta f=2^u*15$ kHz.

TABLE 2

| u | $N^{slot}_{symb}$ | $N^{frame,u}_{slot}$ | $N^{subframe,u}_{slot}$ |
|---|---|---|---|
| 2 | 12 | 40 | 4 |

A slot includes plural symbols (e.g., 14 or 12 symbols) in the time domain. For each numerology (e.g., subcarrier spacing) and carrier, a resource grid of $N^{size,u}_{grid,x}*N^{RB}_{sc}$ subcarriers and $N^{subframe,u}_{symb}$ OFDM symbols is defined, starting at common resource block (CRB) $N^{state,u}_{grid}$ indicated by higher-layer signaling (e.g., RRC signaling), where $N^{size,u}_{grid,x}$ is the number of resource blocks (RBs) in the resource grid and the subscript x is DL for downlink and UL for uplink. $N^{RB}_{sc}$ is the number of subcarriers per RB. In the 3GPP based wireless communication system, $N^{RB}_{sc}$ is 12 generally. There is one resource grid for a given antenna port p, subcarrier spacing configuration u, and transmission direction (DL or UL). The carrier bandwidth $N^{size,u}_{grid}$ for subcarrier spacing configuration u is given by the higher-layer parameter (e.g., RRC parameter). Each element in the resource grid for the antenna port p and the subcarrier spacing configuration u is referred to as a resource element (RE) and one complex symbol may be mapped to each RE. Each RE in the resource grid is uniquely identified by an index k in the frequency domain and an index l representing a symbol location relative to a reference point in the time domain. In the 3GPP based wireless communication system, an RB is defined by 12 consecutive subcarriers in the frequency domain. In the 3GPP NR system, RBs are classified into CRBs and physical resource blocks (PRBs). CRBs are numbered from 0 and upwards in the frequency domain for subcarrier spacing configuration u. The center of subcarrier 0 of CRB 0 for subcarrier spacing configuration u coincides with 'point A' which serves as a common reference point for resource block grids. In the 3GPP NR system, PRBs are defined within a bandwidth part (BWP) and numbered from 0 to $N^{size}_{BWP,i}-1$, where i is the number of the bandwidth part. The relation between the physical resource block $n_{PRB}$ in the bandwidth part i and the common resource block $n_{CRB}$ is as follows: $n_{PRB}=n_{CRB}+N^{size}_{BWP,i}$, where $N^{size}_{BWP,i}$ is the common resource block where bandwidth part starts relative to CRB 0. The BWP includes a plurality of consecutive RBs. A carrier may include a maximum of N (e.g., 5) BWPs. A UE may be configured with one or more BWPs on a given component carrier. Only one BWP among BWPs configured to the UE can active at a time. The active BWP defines the UE's operating bandwidth within the cell's operating bandwidth.

The NR frequency band may be defined as two types of frequency range, i.e., FR1 and FR2. The numerical value of the frequency range may be changed. For example, the frequency ranges of the two types (FR1 and FR2) may be as shown in Table 3 below. For ease of explanation, in the frequency ranges used in the NR system, FR1 may mean "sub 6 GHz range", FR2 may mean "above 6 GHz range," and may be referred to as millimeter wave (mmW).

TABLE 3

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 4 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 4

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

In the present disclosure, the term "cell" may refer to a geographic area to which one or more nodes provide a communication system, or refer to radio resources. A "cell" as a geographic area may be understood as coverage within which a node can provide service using a carrier and a "cell" as radio resources (e.g., time-frequency resources) is associated with bandwidth which is a frequency range configured by the carrier. The "cell" associated with the radio resources is defined by a combination of downlink resources and uplink resources, for example, a combination of a DL component carrier (CC) and a UL CC. The cell may be configured by downlink resources only, or may be configured by downlink resources and uplink resources. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of radio resources used by the node. Accordingly, the term "cell" may be used to represent service coverage of the node sometimes, radio resources at other times, or a range that signals using the radio resources can reach with valid strength at other times. In CA, two or more CCs are aggregated. A UE may simultaneously receive or transmit on one or multiple CCs depending on its capabilities. CA is supported for both contiguous and non-contiguous CCs. When CA is configured, the UE only has one RRC connection with the network. At RRC connection establishment/re-establishment/handover, one serving cell provides the NAS mobility information, and at RRC connection re-establishment/handover, one serving cell provides the security input. This cell is referred to as the primary cell (PCell). The PCell is a cell, operating on the primary frequency, in which the UE either performs the initial connection establishment procedure or initiates the connection re-establishment procedure. Depending on UE capabilities, secondary cells (SCells) can be configured to form together with the PCell a set of serving cells. An SCell is a cell providing additional radio resources on top of special cell (SpCell). The configured set of serving cells for a UE therefore always consists of one PCell and one or more SCells. For dual connectivity (DC) operation, the term SpCell refers to the PCell of the master cell group (MCG) or the primary SCell (PSCell) of the secondary cell group (SCG). An SpCell supports PUCCH transmission and contention-based random access, and is always activated. The MCG is a group of serving cells associated with a master node, comprised of the SpCell (PCell) and optionally one or more SCells. The SCG is the subset of serving cells associated with a secondary node, comprised of the PSCell and zero or more SCells, for a UE configured with DC. For a UE in RRC_CONNECTED not configured with CA/DC, there is only one serving cell comprised of the PCell. For a UE in RRC_CONNECTED configured with CA/DC, the term "serving cells" is used to denote the set of cells comprised of the SpCell(s) and all SCells. In DC, two MAC entities are configured in a UE: one for the MCG and one for the SCG.

Figure 9:
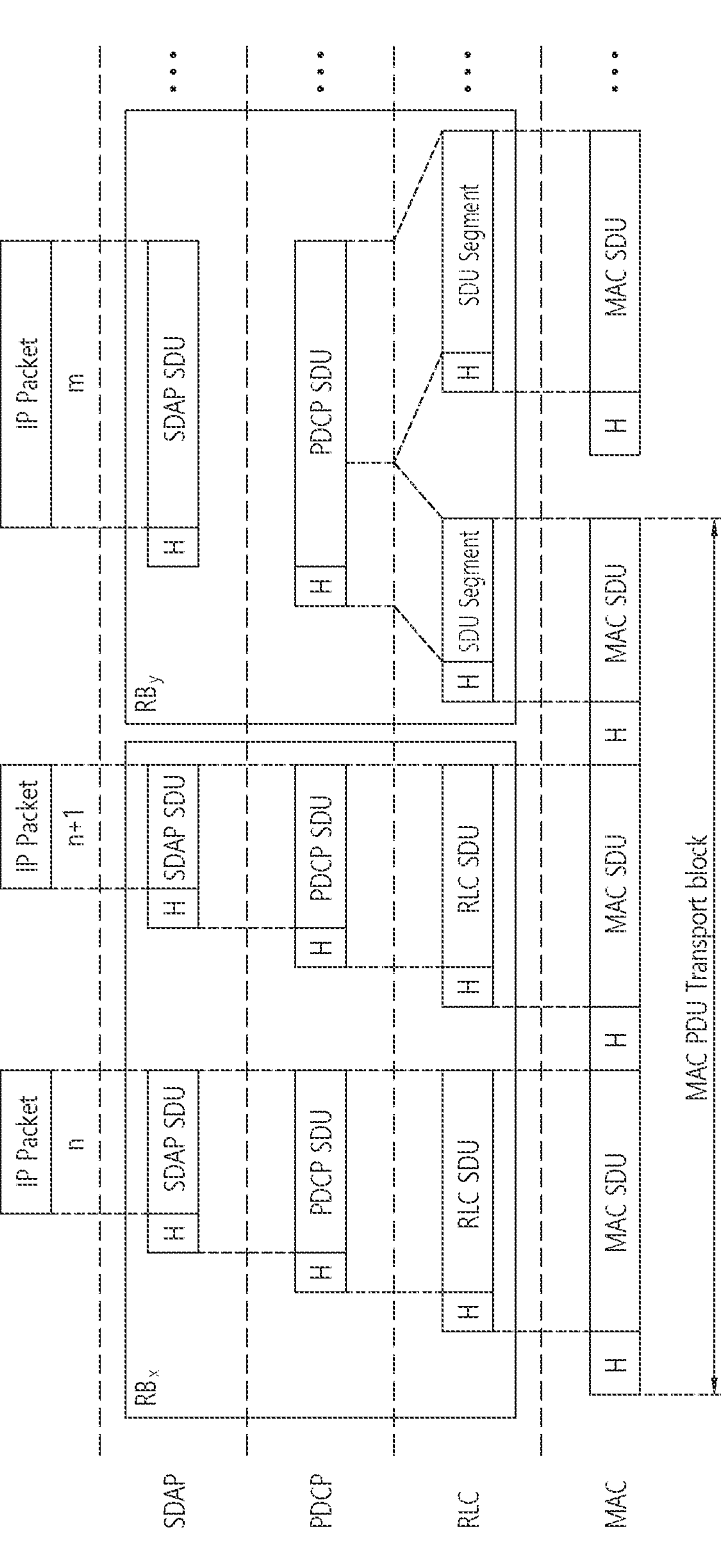
FIG. 9 shows a data flow example in the 3GPP NR system to which implementations of the present disclosure is applied.

FIG. 9 shows a data flow example in the 3GPP NR system to which implementations of the present disclosure is applied.

Referring to FIG. 9, "RB" denotes a radio bearer, and "H" denotes a header. Radio bearers are categorized into two groups: DRBs for user plane data and SRBs for control plane data. The MAC PDU is transmitted/received using radio resources through the PHY layer to/from an external device. The MAC PDU arrives to the PHY layer in the form of a transport block.

In the PHY layer, the uplink transport channels UL-SCH and RACH are mapped to their physical channels physical uplink shared channel (PUSCH) and physical random access channel (PRACH), respectively, and the downlink transport channels DL-SCH, BCH and PCH are mapped to physical downlink shared channel (PDSCH), physical broadcast channel (PBCH) and PDSCH, respectively. In the PHY layer, uplink control information (UCI) is mapped to physical uplink control channel (PUCCH), and downlink control information (DCI) is mapped to physical downlink control channel (PDCCH). A MAC PDU related to UL-SCH is transmitted by a UE via a PUSCH based on an UL grant, and a MAC PDU related to DL-SCH is transmitted by a BS via a PDSCH based on a DL assignment.

Hereinafter, random access (RA) procedure (or, RA channel (RACH) procedure) is described.

Figure 10:
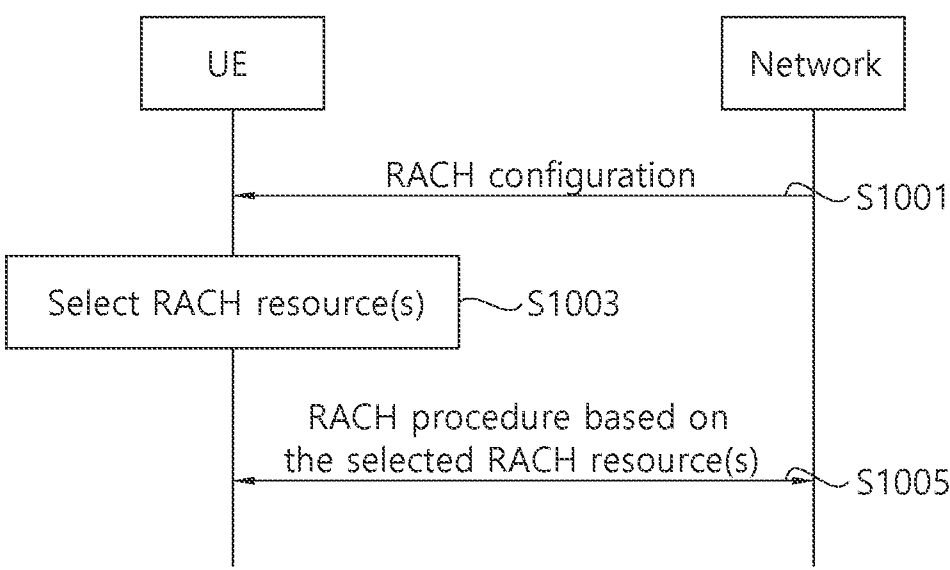
FIG. 10 shows an example of overall RA procedure according to an embodiment of the present disclosure.

FIG. 10 shows an example of overall RA procedure according to an embodiment of the present disclosure. In the RA procedure, UE and network may be involved.

Referring to FIG. 10, in step S1001, the UE may receive a RACH configuration from the network. The RACH configuration may comprise at least one of RACH-ConfigCommon for a 4-step contention-based RA (CBRA), RACH-ConfigCommonTwoSlepRA for a 2-step CBRA, or RACH-ConfigDedicated for a contention-free RA (CFRA).

The RACH-ConfigCommon may comprise the following information elements (IEs) as shown in table 5:

TABLE 5

```
-- ASN1START
-- TAG-RACH-CONFIGCOMMON-START
RACH-ConfigCommon ::=                    SEQUENCE {
    rach-ConfigGeneric                       RACH-ConfigGeneric,
    totalNumberOfRA-Preambles                               INTEGER    (1..63)
OPTIONAL,   -- Need S
    ssb-perRACH-Occasion AndCB-PreamblesPerSSB        CHOICE {
        oneEighth                                                  ENUMERATED
{n4,n8,n12,n16,n20,n24,n28,n32,n36,n40,n44,n48,n52,n56,n60,n64},
        oneFourth                                                  ENUMERATED
{n4,n8,n12,n16,n20,n24,n28,n32,n36,n40,n44,n48,n52,n56,n60,n64},
        oneHalf                                                    ENUMERATED
{n4,n8,n12,n16,n20,n24,n28,n32,n36,n40,n44,n48,n52,n56,n60,n64},
        one                                                        ENUMERATED
{n4,n8,n12,n16,n20,n24,n28,n32,n36,n40,n44,n48,n52,n56,n60,n64},
        two                                                        ENUMERATED
{n4,n8,n12,n16,n20,n24,n28,n32},
        four                                       INTEGER (1..16),
        eight                                      INTEGER (1..8),
        sixteen                                    INTEGER (1..4)
    }
OPTIONAL,   -- Need M
    groupBconfigured                         SEQUENCE {
        ra-Msg3SizeGroupA                        ENUMERATED {b56, b144,
b208, b256, b282, b480, b640,
                                                           b800,   b1000,
b72, spare6, spare5,spare4, spare3, spare2, spare1},
        messagePowerOffsetGroupB                          ENUMERATED
{ minusinfinity, dB0, dB5, dB8, dB10, dB12, dB15, dB18},
        numberOfRA-PreamblesGroupA               INTEGER (1..64)
    }
OPTIONAL,   -- Need R
    ra-ContentionResolution Timer            ENUMERATED { sf8, sf16, sf24,
sf32, sf40, sf48, sf56, sf64},
    rsrp-ThresholdSSB                                          RSRP-Range
OPTIONAL,   -- Need R
    rsrp-ThresholdSSB-SUL                                      RSRP-Range
OPTIONAL,   -- Cond SUL
    prach-RootSequenceIndex                  CHOICE {
        l839                                     INTEGER (0..837),
        l139                                     INTEGER (0..137)
    },
    msg1-SubcarrierSpacing                                SubcarrierSpacing
OPTIONAL,   -- Cond L139
    restrictedSetConfig                      ENUMERATED {unrestrictedSet,
restrictedSetTypeA, restrictedSetTypeB},
    msg3-transformPrecoder                        ENUMERATED {enabled}
OPTIONAL,   -- Need R
    ...,
    [[
    ra-PrioritizationForAccessIdentity-r16   SEQUENCE {
        ra-Prioritization-r16                    RA-Prioritization,
        ra-PrioritizationForAI-r16               BIT STRING (SIZE (2))
    }
OPTIONAL,   -- Cond InitialBWP-Only
    prach-RootSequenceIndex-r16              CHOICE {
        l571                                     INTEGER (0..569),
        l1151                                    INTEGER (0..1149)
    }  OPTIONAL   -- Need R
    ]]
}
-- TAG-RACH-CONFIGCOMMON-STOP
-- ASN1STOP
```

In table 5:—messagePowerOffsetGroupB is a threshold for preamble selection:

msg1-SubcarrierSpacing is a subcarrier spacing of physical RACH (PRACH). Only the values 15 or 30 kHz (FR1), and 60 or 120 kHz (FR2) are applicable. If absent, the UE applies the SCS as derived from the prach-ConfigurationIndex in RACH-ConfigGeneric. The value also applies to contention free random access (RACH-ConfigDedicated), to SI-request and to contention-based beam failure recovery (CB-BFR). But it does not apply for contention free beam failure recovery (CF-BFR);

msg3-transformPrecoder enables the transform precoder for Msg3 transmission. If the field is absent, the UE disables the transformer precoder;

prach-RoolSequenceIndex is a PRACH root sequence index. The value range depends on whether L=839 or L=139 or L=571 or L=1151. The length of the root sequence corresponding with the index indicated in this IE should be consistent with the one indicated in prach-ConfigurationIndex in the RACH-ConfigDedicated (if configured). If prach-RootSequenceIndex-r16 is signalled, UE shall ignore the prach-RootSequenceIndex (without suffix);

ra-ContentionResolutionTimer is the initial value for the contention resolution timer;

ra-Msg3SizeGroupA is a transport Blocks size threshold in bits below which the UE shall use a contention-based RA preamble of group A;

ra-Prioritization is parameters which apply for prioritized random access procedure on any UL BWP of SpCell for specific Access Identities;

ra-PrioritizationForAI indicates whether the field ra-Prioritization-r16 applies for Access Identities. The first/leftmost bit corresponds to Access Identity 1, the next bit corresponds to Access Identity 2. Value 1 indicates that the field ra-Prioritization-r16 applies otherwise the field does not apply;

rach-ConfigGeneric is RACH parameters for both regular random access and beam failure recovery;

restrictedSetConfig is a configuration of an unrestricted set or one of two types of restricted sets;

rsrp-ThresholdSSB is a threshold, where UE may select the SS block and corresponding PRACH resource for path-loss estimation and (re)transmission based on SS blocks that satisfy the threshold;

rsrp-ThresholdSSB-SUL is a threshold, where the UE selects SUL carrier to perform random access based on this threshold. The value applies to all the BWPs;

ssb-perRACH-OccasionAndCB-PreamhlesPerSSB: the CHOICE conveys the information about the number of SSBs per RACH occasion. Value oneEighth corresponds to one SSB associated with 8 RACH occasions, value oneFourth corresponds to one SSB associated with 4 RACH occasions, and so on. The ENUMERATED part indicates the number of Contention Based preambles per SSB. Value n4 corresponds to 4 Contention Based preambles per SSB, value n8 corresponds to 8 Contention Based preambles per SSB, and so on. The total number of CB preambles in a RACH occasion is given by CB-preambles-per-SSB*max(1, SSB-per-rach-occasion); and/or totalNumberOfRA-Preambles is the total number of preambles used for contention based and contention free 4-step or 2-step random access in the RACH resources defined in RACH-ConfigCommon, excluding preambles used for other purposes (e.g. for SI request). If the field is absent, all 64 preambles are available for RA. The setting should be consistent with the setting of ssb-perRACH-OccasionAndCB-PreamblesPerSSB, i.e. it should be a multiple of the number of SSBs per RACH occasion.

The RACH-ConfigCommonTwoStepRA may comprise the following information elements (IEs) as shown in table 6:

TABLE 6

```
-- ASN1START
-- TAG-RACH-CONFIGCOMMONTWOSTEPRA-START
RACH-ConfigCommonTwoStepRA-r16 ::=                                   SEQUENCE {
     rach-ConfigGenericTwoStepRA-r16                                         RACH-
ConfigGenericTwoStepRA-r16,
     msgA-TotalNumberOfRA-Preambles-r16                                   INTEGER
(1..63)                                       OPTIONAL, -- Need S
     msgA-SSB-PerRACH-OccasionAndCB-PreamblesPerSSB-r16        CHOICE {
          oneEighth
ENUMERATED {n4,n8,n12,n16,n20,n24,n28,n32,n36,n40,n44,n48,n52,n56,n60,n64},
          oneFourth
ENUMERATED {n4,n8,n12,n16,n20,n24,n28,n32,n36,n40,n44,n48,n52,n56,n60,n64},
          oneHalf
ENUMERATED {n4,n8,n12,n16,n20,n24,n28,n32,n36,n40,n44,n48,n52,n56,n60,n64},
          one
ENUMERATED {n4,n8,n12,n16,n20,n24,n28,n32,n36,n40,n44,n48,n52,n56,n60,n64},
          two
ENUMERATED {n4,08,n12,n16,n20,n24,n28,n32},
          four
INTEGER (1..16),
          eight
INTEGER (1..8),
          sixteen                                                   INTEGER
(1..4)
     }
OPTIONAL, -- Cond 2StepOnly
     msgA-CB-PreamblesPerSSB-PerSharedRO-r16                    INTEGER
(1..60)                                                   OPTIONAL, -- Cond
SharedRO
     msgA-SSB-SharedRO-MaskIndex-r16                             INTEGER
(1..15)                                                   OPTIONAL, -- Need S
     groupB-ConfiguredTwoStepRA-r16                                  GroupB-
ConfiguredTwoStepRA-r16                                   OPTIONAL, -- Need S
     msgA-PRACH-RootSequenceIndex-r16                            CHOICE {
          l839
INTEGER (0..837),
          l139
INTEGER (0..137),
          l571
INTEGER (0..569),
          l1151
INTEGER (0..1149)
     }
OPTIONAL, -- Cond 2StepOnly
     msgA-TransMax-r16
ENUMERATED {n1, n2, n4, n6, n8, n10, n20, n50, n100, n200}     OPTIONAL, -- Need
R
```

TABLE 6-continued

```
            msgA-RSRP-Threshold-r16                                RSRP-Range
OPTIONAL, -- Cond 2Step4Step
            msgA-RSRP-ThresholdSSB-r16                             RSRP-Range
OPTIONAL, -- Need R
            msgA-SubcarrierSpacing-r16
SubcarrierSpacing                                                OPTIONAL, --
Cond 2StepOnlyL139
            msgA-RestrictedSetConfig-r16                          ENUMERATED
{unrestrictedSet, restrictedSetTypeA,
restrictedSetTypeB}                                OPTIONAL, -- Cond 2StepOnly
            ra-PrioritizationForAccessIdentity TwoStep-r16        SEQUENCE {
                ra-Prioritization-r16                                      RA-
Prioritization,
                ra-PrioritizationForAI-r16                         BIT STRING
(SIZE (2))
            }
OPTIONAL, -- Cond InitialBWP-Only
            ra-ContentionResolutionTimer-r16                      ENUMERATED
{sf8, sf16, sf24, sf32, sf40, sf48, sf56, sf64}    OPTIONAL, -- Cond 2StepOnly
            ...
        }
        GroupB-ConfiguredTwoStepRA-r16 ::=                        SEQUENCE {
            ra-MsgA-SizeGroupA
ENUMERATED {b56, b144, b208, b256, b282, b480, b640, b800,
b1000, b72, spare6, spare5, spare4, spare3, spare2, sparel },
            messagePowerOffsetGroupB
ENUMERATED {minusinfinity, dB0, dB5, dB8, dB10, dB12, dB15, dB18},
            numberOfRA-PreamblesGroupA                               INTEGER
(1..64)
        }
        -- TAG-RACH-CONFIGCOMMONTWOSTEPRA-STOP
        ASN1STOP
```

In table 6:—groupB-ConfiguredTwoStepRA is a preamble grouping for 2-step random access type. If the field is absent then there is only one preamble group configured and only one msgA PUSCH configuration;

- msgA-CB-PreamblesPerSSB-PerSharedRO is the Number of contention-based preambles used for 2-step RA type from the non-CBRA 4-step type preambles associated with each SSB for RO shared with 4-step type RA. The number of preambles for 2-step RA type shall not exceed the number of preambles per SSB minus the number of contention-based preambles per SSB for 4-step type RA. The possible value range for this parameter needs to be aligned with value range for the configured SSBs per RACH occasion in ssb-perRACH-OccasionAndCB-PreamblesPerSSB in RACH-ConfigCommon. The field is only applicable for the case of shared ROs with 4-step type random access;
- msgA-PRACH-RootSequenceIndex is a PRACH root sequence index. If the field is not configured, the UE applies the value in field prach-RootSequenceIndex in RACH-ConfigCommon in the configured BWP. When both 2-step and 4-step type random access is configured, this field is only configured for the case of separate ROs between 2-step and 4-step type random access;
- msgA-RestrictedSetConfig is a configuration of an unrestricted set or one of two types of restricted sets for 2-step random access type preamble. If the field is not configured, the UE applies the value in field restrictedSetConfig in RACH-ConfigCommon in the configured BWP. When both 2-step and 4-step type random access is configured, this field is only configured for the case of separate ROs between 2-step and 4-step type random access;
- msgA-RSRP-Threshold is a threshold, where the UE selects 2-step random access type to perform random access based on this threshold. This field is only present if both 2-step and 4-step RA type are configured for the BWP;
- msgA-RSRP-ThresholdSSB is a threshold, where the UE may select the SS block and corresponding PRACH resource for path-loss estimation and (re)transmission based on SS blocks that satisfy the threshold;
- msgA-SSB-PerRACH-OccasionAndCB-Preambles-PerSSB: the CHOICE conveys the information about the number of SSBs per RACH occasion. Value oneEight corresponds to one SSB associated with 8 RACH occasions, value oneFourth corresponds to one SSB associated with 4 RACH occasions, and so on. The ENUMERATED part indicates the number of Contention Based preambles per SSB. Value n4 corresponds to 4 Contention Based preambles per SSB, value n8 corresponds to 8 Contention Based preambles per SSB, and so on. The total number of CB preambles in a RACH occasion is given by CB-preambles-per-SSB*max(1, SSB-per-rach-occasion). If the field is not configured and both 2-step and 4-step are configured for the BWP, the UE applies the value in the field ssb-perRACH-OccasionAndCB-PreamblesPerSSB in RACH-ConfigCommon. The field is not present when RACH occasions are shared between 2-step and 4-step type random access in the BWP;
- msgA-SSB-SharedRO-MaskIndex indicates the subset of 4-step type ROs shared with 2-step random access type for each SSB. This field is configured when there is more than one RO per SSB. If the field is absent, and 4-step and 2-step has shared ROs, then all ROs are shared;
- msgA-SubcarrierSpacing is a subcarrier spacing of PRACH. Only the values 15 or 30 kHz (FR1), and 60 or 120 kHz (FR2) are applicable. The field is only present in case of 2-step only BWP, otherwise the UE applies the SCS as derived from the msg1-Subcarrier- Spacing in RACH-ConfigCommon. The value also applies to contention free 2-step random access type (RACH-(ConfigDedicated);

msgA-TotalNtunberOfRA-Preambles indicates the total number of preambles used for contention-based and contention-free 2-step random access type when ROs for 2-step are not shared with 4-step. If the field is absent, and 2-step and 4-step does not have shared ROs, all 64 preambles are available for 2-step random access type;

msgA-TransMax is the max number of MsgA preamble transmissions performed before switching to 4-step random access. This field is only applicable when 2-step and 4-step RA type are configured and switching to 4-step type RA is supported. If the field is absent, switching from 2-step RA type to 4-step RA type is not allowed:

ra-ContentionResolutionTimer is the initial value for the contention resolution timer for fallback RAR in case no 4-step random access type is configured. If both 2-step and 4-step random access type resources are configured on the BWP, then this field is absent;

ra-Prioritization is parameters which apply for prioritized random access procedure on any UL BWP of SpCell for specific Access Identities;

ra-PrioritizationForAI indicates whether the field ra-Prioritization-r16 applies for Access Identities. The first/left-most bit corresponds to Access Identity 1, the next bit corresponds to Access Identity 2. Value 1 for an Access Identity indicates that the field ra-Prioritization-r16 applies, otherwise the field does not apply;

rach-ConfigGenericTwoStepRA is 2-step random access type parameters for both regular random access and beam failure recovery;

messagePowerOfsetGroupB is a threshold for preamble selection;

numberOfRA-PreamblesGroupA is the number of CB preambles per SSB in group A for idle/inactive or connected mode. The setting of the number of preambles for each group should be consistent with msgA-SSB-PerRACH-OccasionAndCB-PreamblesPerSSB or msgA-CB-Preambles-PerSSB-PerSharedRO if configured; and/or ra-MsgA-SizeGroupA is a transport block size threshold in bits below which the UE shall use a contention-based RA preamble of group A.

The RACH-ConfigDedicated may comprise the following information elements (IEs) as shown in table 7:

TABLE 7

```
-- ASN1START
-- TAG-RACH-CONFIGDEDICATED-START
RACH-ConfigDedicated ::=          SEQUENCE {
    cfra                                                    CFRA
OPTIONAL, -- Need S
    ra-Prioritization                                       RA-Prioritization
OPTIONAL, -- Need N
    ...,
    [[
    ra-PrioritizationTwoStep-r16                            RA-Prioritization
OPTIONAL, -- Need N
    cfra-TwoStep-r16                                        CFRA-TwoStep-r16
OPTIONAL -- Need S
    ]]
}
CFRA ::=                          SEQUENCE {
    occasions                         SEQUENCE {
        rach-ConfigGeneric                RACH-ConfigGeneric,
        ssb-perRACH-Occasion                  ENUMERATED {oneEighth,
oneFourth, oneHalf, one, two, four, eight, sixteen}
OPTIONAL   -- Cond Mandatory
    }
OPTIONAL, -- Need S
    resources                         CHOICE {
        ssb                               SEQUENCE {
            ssb-ResourceList                  SEQUENCE (SIZE(1..maxRA-
SSB-Resources)) OF CFRA-SSB-Resource,
            ra-ssb-OccasionMaskIndex          INTEGER (0..15)
        },
        csirs                             SEQUENCE {
            csirs-ResourceList                SEQUENCE (SIZE(1..maxRA-
CSIRS-Resources)) OF CFRA-CSIRS-Resource,
            rsrp-ThresholdCSI-RS              RSRP-Range
        }
    },
    ...,
    [[
    totalNumberOfRA-Preambles             INTEGER              (1..63)
OPTIONAL -- Cond Occasions
    ]]
}
CFRA-TwoStep-r16 ::=                  SEQUENCE {
    occasionsTwoStepRA-r16                SEQUENCE {
        rach-ConfigGenericTwoStepRA-r16                       RACH-
ConfigGenericTwoStepRA-r16,
        ssb-PerRACH-OccasionTwoStepRA-r16                 ENUMERATED
{oneEighth, oneFourth, oneHalf, one,
                                                          two, four,
eight, sixteen}
    }
```

TABLE 7-continued

```
OPTIONAL, -- Need S
            msgA-CFRA-PUSCH-r16                              MsgA-PUSCH-Resource-
r16,
            msgA-TransMax-r16                              ENUMERATED {n1, n2, n4,
n6, n8, n10, n20, n50, n100, n200}     OPTIONAL, -- Need S
            resourcesTwoStep-r16                        SEQUENCE {
                ssb-ResourceList                                                SEQUENCE
(SIZE(1..maxRA-SSB-Resources)) OF CFRA-SSB-Resource,
                ra-ssb-OccasionMaskIndex                     INTEGER (0..15)
            },
            ...
        }
        CFRA-SSB-Resource ::=             SEQUENCE {
            ssb                                  SSB-Index,
            ra-PreambleIndex                  INTEGER (0..63),
            ...,
            [[
            msgA-PUSCH-Resource-Index-r16      INTEGER (0..3071)          OPTIONAL
-- Cond 2StepCFRA
            ]]
        }
        CFRA-CSIRS-Resource :=              SEQUENCE {
            csi-RS                              CSI-RS-Index,
            ra-OccasionList                              SEQUENCE (SIZE(1..maxRA-
OccasionsPerCSIRS)) OF INTEGER (0..maxRA-Occasions-1),
            ra-PreambleIndex                  INTEGER (0..63),
            ...
        }
        -- TAG-RACH-CONFIGDEDICATED-STOP
        -- ASN1STOP
```

In table 7:—cfra is parameters for contention free random access to a given target cell. If this field and cfra-TwoStep are absent, the UE performs contention based random access;

cfra-TwoStep is parameters for contention free 2-step random access type to a given target cell. Network ensures that cfra and cfra-TwoStep are not configured at the same time. If this field and cfra are absent, the UE performs contention based random access. This field may only be present if msgA-ConfigCommon is configured on the BWP;

ra-prioritization is parameters which apply for prioritized random access procedure to a given target cell;

ra-PrioritizationTwoStep is parameters which apply for prioritized 2-step random access type procedure to a given target cell;

msgA-CFRA-PUSCH is PUSCH resource configuration(s) for msgA CFRA;

msgA-TransMax is the max number of MsgA preamble transmissions performed before switching to 4-step type random access. This field is only applicable when 2-step and 4-step RA type are configured and switching to 4-step type RA is supported. If the field is absent in RACH-ConnfigDedidated, switching from 2-step RA type to 4-step RA type is not allowed;

occasionsTwoStepRA is RA occasions for contention free random access. If the field is absent, the UE uses the RA occasions configured in RACH-ConfigCommonTwoStepR4 in the first active UL BWP;

ra-SSB-OccasionMaskIndex is explicitly signalled PRACH Mask Index for RA Resource selection. The mask is valid for all SSB resources signalled in ssb-ResourceList;

rach-ConfigGenericTwoStepRA is a configuration of contention free random access occasions for CFRA 2-step random access type;

ssb-PerRACH-OccasionTwoStep is the number of SSBs per RACH occasion for 2-step random access type;

msg4-PUSCH-Resource-Index identifies the index of the PUSCH resource used for MSGA CFRA. The PUSCH resource index indicates a valid PUSCH occasion and the associated DMRS resources corresponding to a PRACH slot. The PUSCH resource indexes are sequentially numbered and are mapped to valid PUSCH occasions corresponding to a PRACH slot which are ordered, first, in increasing order of frequency resource indexes for frequency multiplexed PUSCH occasions; second, in increasing order of DMRS resource indexes within a PUSCH occasion, where a DMRS resource index DMRS_id is determined first in an ascending order of a DMRS port index and then in an ascending order of a DMRS sequence index, third in increasing order of time resource indexes for time multiplexed PUSCH occasions within a PUSCH slot and fourth, in increasing order of indexes for PUSCH slots. For the case of contention free 2-step random access type, if this field is absent, the UE shall use the value 0;

ra-PreambleIndex is the preamble index that the UE shall use when performing CF-RA upon selecting the candidate beams identified by this SSB;

ssb is the ID of an SSB transmitted by this serving cell;

occasions is RA occasions for contention free random access. If the field is absent, the UE uses the RA occasions configured in RACH-ConfigCommon in the first active UL BWP;

ra-ssb-OccasionMaskIndex is explicitly signalled PRACH Mask Index for RA Resource selection. The mask is valid for all SSB resources signalled in ssb-ResourceList;

rach-ConfigGeneric is a configuration of contention free random access occasions for CFRA. The UE shall ignore preambleReceivedTargetPower, preambleTransMax. powerRampingStep, ra-ResponseWindow signaled within this field and use the corresponding values provided in RACH-ConfigCommon;

ssb-perRACH-Occasion is the number of SSBs per RACH occasion;

totalNumberQfRA-Preambles is the total number of preambles used for contention free random access in the RACH resources defined in CFRA, excluding preambles used for other purposes (e.g. for SI request). If the field is absent but the field occasions is present, the UE may assume all the 64 preambles are for RA. The setting should be consistent with the setting of ssb-perRACH-Occasion, if present, i.e. it should be a multiple of the number of SSBs per RACH occasion;

csi-RS is the ID of a CSI-RS resource defined in the measurement object associated with this serving cell;

ra-OccasionList is RA occasions that the UE shall use when performing CF-RA upon selecting the candidate beam identified by this CSI-RS. The network ensures that the RA occasion indexes provided herein are also configured by prach-ConfigurationIndex and msg1-FDM. Each RACH occasion is sequentially numbered, first, in increasing order of frequency resource indexes for frequency multiplexed PRACH occasions; second, in increasing order of time resource indexes for time multiplexed PRACH occasions within a PRACH slot and third, in increasing order of indexes for PRACH slots; and/or ra-PreambleIndex is the RA preamble index to use in the RA occasions associated with this CSI-RS.

The RACH-ConfigGeneric may comprise the following information elements (IEs) as shown in table 8:

TABLE 8

```
-- ASN1START
-- TAG-RACH-CONFIGGENERIC-START
RACH-ConfigGeneric ::=                SEQUENCE {
    prach-ConfigurationIndex              INTEGER (0..255),
    msg1-FDM                                  ENUMERATED {one, two, four,
eight},
    msg1-FrequencyStart                                        INTEGER
(0..maxNrofPhysicalResourceBlocks-1),
    zeroCorrelationZoneConfig             INTEGER(0..15),
    preambleReceivedTargetPower            INTEGER (-202..-60),
    preambleTransMax                          ENUMERATED {n3, n4, n5, n6,
n7, n8, n10, n20, n50, n100, n200},
    powerRampingStep                          ENUMERATED {dB0, dB2, dB4,
dB6},
    ra-ResponseWindow                         ENUMERATED {sl1, sl2, sl4, sl8,
sl10, sl20, sl40, sl80},
    ...,
    [[
    prach-ConfigurationPeriodScaling-IAB-r16                  ENUMERATED
{scf1,scf2,scf4,scf8,scf16,scf32,scf64}              OPTIONAL,   -- Need R
    prach-ConfigurationFrameOffset-IAB-r16                  INTEGER (0..63)
OPTIONAL,   -- Need R
    prach-ConfigurationSOffset-IAB-r16                      INTEGER (0..39)
OPTIONAL,   -- Need R
    ra-ResponseWindow-v1610                            ENUMERATED { sl60,
sl160}                                               OPTIONAL, -- Need R
    prach-ConfigurationIndex-v1610                        INTEGER (256..262)
OPTIONAL   -- Need R
    ]]
}
-- TAG-RACH-CONFIGGENERIC-STOP
-- ASN1STOP
```

In Table 8:—msg1-FDM is the number of PRACH transmission occasions FDMed in one time instance;

msg1-FrequencyStart is offset of lowest PRACH transmission occasion in frequency domain with respective to PRB 0. The value is configured so that the corresponding RACH resource is entirely within the bandwidth of the UL BWP;

powerRampingStep is power ramping steps for PRACH;

prach-ConfigurationFrameOfset-IAB is frame offset for ROs defined in the baseline configuration indicated by prach-ConfigurationIndex and is used only by the IAB-MT;

prach-ConfigurationIndex is a PRACH configuration index. For prach-ConfigurationIndex configured under beamFailureRecovery-Config, the prach-ConfigurationIndex can only correspond to the short preamble format. If the field prach-ConfigurationIndex-v1610 is present, the UE shall ignore the value provided in prach-ConfigurationIndex (without suffix), prach-ConfigurationPeriodScaling-IAB is a scaling factor to extend the periodicity of the baseline configuration indicated by prach-ConfigurationIndex and is used only by the IAB-MT;

prach-ConfigurationSOffset-IAB is a subframe/Slot offset for ROs defined in the baseline configuration indicated by prach-ConfigurationIndex and is used only by the IAB-MT;

preambleReceivedTargetPower is the target power level at the network receiver side. Only multiples of 2 dBm may be chosen (e.g. −202, −200, −198, . . . );

preambleTransMax is the max number of RA preamble transmission performed before declaring a failure;

ra-ResponseWindow is a msg2 (RAR) window length in number of slots. The network configures a value lower than or equal to 10 ms when Msg2 is transmitted in licensed spectrum and a value lower than or equal to 40 ms when Msg2 is transmitted with shared spectrum channel access. UE ignores the field if included in SCellConfig. If ra-ResponseWindow-v1610 is signalled, UE shall ignore the ra-Response Window (without suffix); and/or zeroCorrelationZoneConfig is a N-CS configuration.

The RACH-ConfigGenericTwoStepRA may comprise the following information elements (IEs) as shown in table 9:

TABLE 9

```
-- ASN1START
-- TAG-RACH-CONFIGGENERICTWOSTEPRA-START
RACH-ConfigGenericTwoStepRA-r16 ::=       SEQUENCE {
    msgA-PRACH-ConfigurationIndex-r16                    INTEGER (0..262)
OPTIONAL, -- Cond 2StepOnly
    msgA-RO-FDM-r16                              ENUMERATED {one, two,
four, eight}                          OPTIONAL, -- Cond 2StepOnly
    msgA-RO-FrequencyStart-r16                                 INTEGER
(0..maxNrofPhysicalResourceBlocks-1)                      OPTIONAL, -- Cond
2StepOnly
    msgA-ZeroCorrelationZoneConfig-r16                  INTEGER    (0..15)
OPTIONAL, -- Cond 2StepOnly
    msgA-PreamblePowerRampingStep-r16           ENUMERATED {dB0, dB2,
dB4, dB6}                             OPTIONAL, -- Cond 2StepOnlyNoCFRA
    msgA-PreambleReceivedTargetPower-r16              INTEGER (-202..-60)
OPTIONAL, -- Cond 2StepOnlyNoCFRA
    msgB-Response Window-r16                      ENUMERATED {sl1, sl2,
sl4, sl8, sl10, sl20, sl40, sl80, sl160, sl320}
OPTIONAL, -- Cond NoCFRA
    preambleTransMax-r16                          ENUMERATED {n3, n4, n5,
n6, n7, n8, n10, n20, n50, n100, n200}   OPTIONAL, -- Cond 2StepOnlyNoCFRA
    ...
}
-- TAG-RACH-CONFIGGENERICTWOSTEPRA-STOP
-- ASN1STOP
```

In table 9:—msgA-PreamblePowerRampingStep is a power ramping steps for msgA PRACH. If the field is absent, UE shall use the value of powerRampingStep in RACH-ConfigGeneric in the configured BWP. This field may only be present if no 4-step type RA is configured in the BWP or in the case of separate ROs with 4-step type RA. The field is absent if RACH-ConfigGenericTwoStepRA is included in CFRA-TwoStep in RACH-ConfigDedicated and then the UE uses the value of msgA-PreamblePowerRampingStep in RACH-ConfigGenericTwoStepRA configured for CBRA;

msgA-PreambleReceivedTargetPower is the target power level at the network receiver side. Only multiples of 2 dBm may be chosen (e.g −202, −200, −198, 쩐). If the field is absent, UE shall use the value of preambleReceivedTargetPower in RACH-ConfigGeneric in the configured BWP. This field may only be present if no 4-step type RA is configured in the BWP. The field is absent if RACH-ConfigGenericTwoStepRA is included in CFRA-TwoStep in RACH-ConfigDedicated and then the UE uses the value of msgA-PreambleReceivedTargetPower in RACH-ConfigGenericTwoStepRA configured for CBRA;

msgA-PRACH-ConfigurationIndex is a cell-specific PRACH configuration index for 2-step RA type. If the field is absent the UE shall use the value of corresponding 4-step random access parameter in the configured BWP. If the value is in the range of 256 to 262, the field prach-ConfigurationIndex-v1610 should be considered configured. This field may only be present if no 4-step type RA is configured in the BWP or in the case of separate ROs with 4-step type RA;

msgA-RO-FDM is the number of msgA PRACH transmission occasions Frequency-Division Multiplexed in one time instance. If the field is absent, UE shall use value of msg1-FDM in RACH-ConfigGeneric in the configured BWP. This field may only be present if no 4-step type RA is configured in the BWP or in the case of separate ROs with 4-step type RA;

msgA-RO-Frequency Start is an offset of lowest PRACH transmissions occasion in frequency domain with respect to PRB 0. If the field is absent, UE shall use value of msg1-FrequencyStart in RACH-ConfigGeneric in the configured BWP. This field may only be present if no 4-step type RA is configured in the BWP or in the case of separate ROs with 4-step type RA;

msgA-ZeroCorrelationZoneConfig is N-CS configuration for msgA preamble. If the field is absent, UE shall use value zeroCorrelationZoneConfig in RACH-ConfigGeneric in the configured BWP. This field may only be present if no 4-step type RA is configured in the BWP or in the case of separate ROs with 4-step type RA;

msgB-ResponseWindow is a MsgB monitoring window length in number of slots. The network configures a value lower than or equal to 40 ms. If the field is absent, the UE uses the value of msgB-ResponseWindow in RACH-ConfigGenericTwoStepRA configured for CBRA; and/or preambleTransMax is the max number of RA preamble transmission performed before declaring a failure. If the field is absent, UE shall use the value of preambleTransMax in RACH-ConfigGeneric in the configured BWP. The field is absent if RACH-ConfigGenericTwoStepRA is included in CFRA-TwoStep in RACH-ConfigDedicated and then the UE uses the value of preambleTransMax in RACH-ConfigGenericTwoStepRA configured for CBRA.

In step S1003, the UE may select RACH resource(s) (or, RA resource(s)). When CFRA resources for 2-step RA are configured (i.e., RACH-ConfigDedicated with CFRA-TwoStep is configured), the UE may select the CFRA resources for 2-step RA and determine to perform 2-step CFRA. When CFRA resources for 4-step RA are configured (i.e., RACH-ConfigDedicated with CFRA is configured), the UE may select the CFRA resources for 4-step RA and determine to perform 4-step CFRA. When CFRA resources are not configured (i.e., RACH-ConfigDedicated is not configured and only RACH-ConfigCommon and/or RACH-ConfigCommonTwoStepRA are configured), the UE may select CBRA resources for 2-step RA or 4-step RA based on an RSRP threshold (i.e., msgA-RSRP-Threshold). If the RSRP of the downlink pathloss reference is above the msgA-RSRP-Threshold, the UE may select CBRA resources for 2-step RA and determine to perform 2-step CBRA. If the RSRP of the downlink pathloss reference is below the msgA-RSRP-Threshold, the UE may select CBRA resources for 4-step RA and determine to perform 4-step CBRA.

In step S1005, the UE may perform a RACH procedure based on the selected RACH resources. Each of the 4-step and the 2-step RACH procedure is described with FIGS. 11 and 12.

Figure 11:
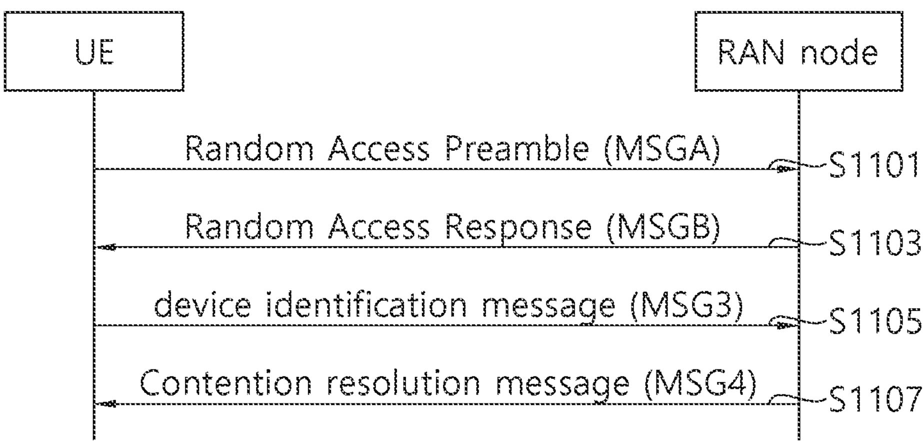
FIG. 11 shows an example of a 4-step RA procedure according to an embodiment of the present disclosure.

FIG. 11 shows an example of a 4-step RA procedure according to an embodiment of the present disclosure.

Referring to FIG. 11, in step S1101, the UE may transmit a random access preamble in uplink, to a RAN node. The UE may transmit a message 1 (MSG1) comprising the random access preamble to the RAN node. The random access preamble may be associated with a random access—radio resource temporary identifier (RA-RNTI). The random access preamble may be selected based on the selected RACH resources, and transmitted through a time/frequency resources identified by the selected RACH resources.

In step S1103, the UE may receive a random access response (RAR) generated by MAC on downlink-shared channel (DL-SCH), from the RAN node. The UE may receive a message 2 (MSG2) comprising the RAR from the RAN node. The UE may monitor a PDCCH with the corresponding RA-RNTI within a RAR-window. When the PDCCH with the corresponding RA-RNTI is detected within the RAR-window, the UE may read the corresponding downlink control information (DCI) scheduling a RAR PDSCH, and receive the RAR in the PDSCH. The RAR may comprise timing advance information for time-synchronized in uplink, UL grant for message 3 transmission, and/or temporary cell-RNTI (TC-RNTI).

In step S1105, the UE may transmit a device identification message to the RAN node. The UE may transmit a message 3 (MSG3) comprising the device identification message via PUSCH corresponding to the UL grant in the RAR. The device identification message may comprise the TC-RNTI.

In step S1107, the UE may receive a contention resolution message from the RAN node. The UE may receive a message 4 (MSG4) comprising the contention resolution message. The UE may monitor a PDCCH with the TC-RNTI. When the PDCCH with the TC-RNTI is detected, the UE may read the corresponding DCI scheduling a PDSCH, receive the contention resolution message in the PDSCH, and set C-RNTI as the TC-RNTI.

The above steps S1101 to S1107 may be applied to CBRA. For CFRA, step S1105 to S1107 may be omitted, and C-RNTI may be included in the RAR instead of TC-RNTI.

Figure 12:
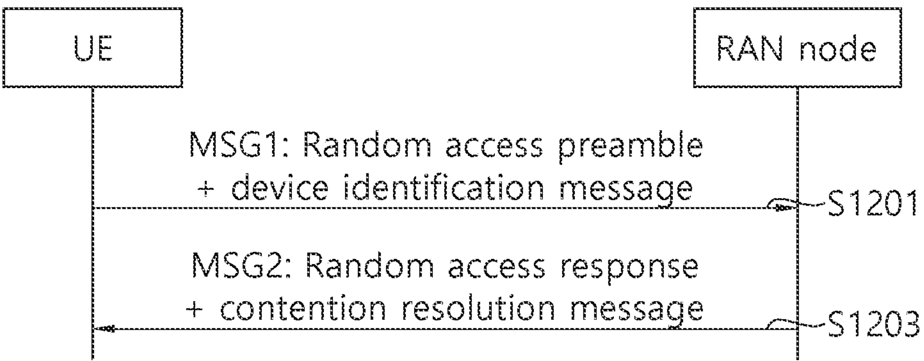
FIG. 12 shows an example of a 2-step RA procedure according to an embodiment of the present disclosure.

FIG. 12 shows an example of a 2-step RA procedure according to an embodiment of the present disclosure.

Referring to FIG. 12, in step S1201, a UE may transmit a random access preamble together with a device identification message to a RAN node. The UE may transmit a message A (or, MSGA) comprising the random access preamble and the device identification message to the RAN node.

In step S1203, the UE may receive a random access response together with a contention resolution message from the RAN node. The UE may receive a message B (or, MSGB) comprising the random access response and the contention resolution message from the RAN node.

The above steps S1201 to S1203 may be applied to CBRA. For CFRA, device identification message and/or contention resolution message may be omitted in the MSGA and the MSGB, respectively, and C-RNTI may be included in the RAR instead of TC-RNTI.

Figure 13:
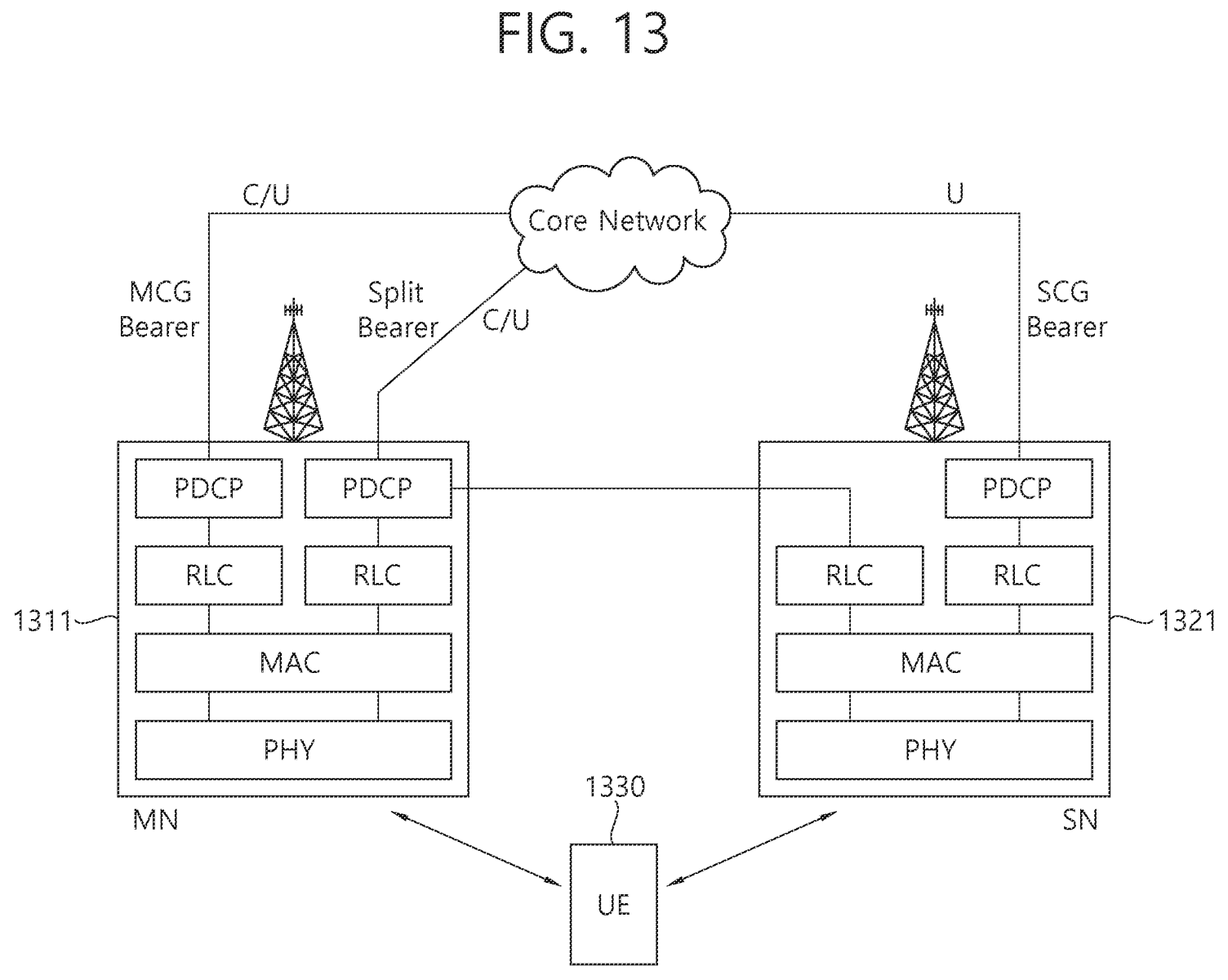

FIG. 13 shows an example of a dual connectivity (DC) architecture to which technical features of the present disclosure can be applied.

Referring to FIG. 13, MN 1311, SN 1321, and a UE 1330 communicating with both the MN 1311 and the SN 1321 are illustrated. As illustrated in FIG. 13, DC refers to a scheme in which a UE (e.g., UE 1330) utilizes radio resources provided by at least two RAN nodes comprising a MN (e.g., MN 1311) and one or more SNs (e.g., SN 1321). In other words. DC refers to a scheme in which a UE is connected to both the MN and the one or more SNs, and communicates with both the MN and the one or more SNs. Since the MN and the SN may be in different sites, a backhaul between the MN and the SN may be construed as non-ideal backhaul (e.g., relatively large delay between nodes).

MN (e.g., MN 1311) refers to a main RAN node providing services to a UE in DC situation. SN (e.g., SN 1321) refers to an additional RAN node providing services to the UE with the MN in the DC situation. If one RAN node provides services to a UE, the RAN node may be a MN. SN can exist if MN exists.

For example, the MN may be associated with macro cell whose coverage is relatively larger than that of a small cell. However, the MN does not have to be associated with macro cell—that is, the MN may be associated with a small cell. Throughout the disclosure, a RAN node that is associated with a macro cell may be referred to as ‘macro cell node’. MN may comprise macro cell node.

For example, the SN may be associated with small cell (e.g., micro cell, pico cell, femto cell) whose coverage is relatively smaller than that of a macro cell. However, the SN does not have to be associated with small cell—that is, the SN may be associated with a macro cell. Throughout the disclosure, a RAN node that is associated with a small cell may be referred to as ‘small cell node’. SN may comprise small cell node.

The MN may be associated with a master cell group (MCG). MCG may refer to a group of serving cells associated with the MN, and may comprise a primary cell (PCell) and optionally one or more secondary cells (SCells). User plane data and/or control plane data may be transported from a core network to the MN through a MCG bearer. MCG bearer refers to a bearer whose radio protocols are located in the MN to use MN resources. As shown in FIG. 13, the radio protocols of the MCG bearer may comprise PDCP, RLC, MAC and/or PHY.

The SN may be associated with a secondary cell group (SCG). SCG may refer to a group of serving cells associated with the SN, and may comprise a primary secondary cell (PSCell) and optionally one or more SCells. User plane data may be transported from a core network to the SN through a SCG bearer. SCG bearer refers to a bearer whose radio protocols are located in the SN to use SN resources. As shown in FIG. 13, the radio protocols of the SCG bearer may comprise PDCP, RLC, MAC and PHY.

User plane data and/or control plane data may be transported from a core network to the MN and split up/duplicated in the MN, and at least part of the split/duplicated data may be forwarded to the SN through a split bearer. Split bearer refers to a bearer whose radio protocols are located in both the MN and the SN to use both MN resources and SN resources. As shown in FIG. 13, the radio protocols of the split bearer located in the MN may comprise PDCP, RLC, MAC and PHY. The radio protocols of the split bearer located in the SN may comprise RLC, MAC and PHY.

According to various embodiments, PDCP anchor/PDCP anchor point/PDCP anchor node refers to a RAN node comprising a PDCP entity which splits up and/or duplicates data and forwards at least part of the split/duplicated data over X2/Xn interface to another RAN node. In the example of FIG. 13, PDCP anchor node may be MN.

According to various embodiments, the MN for the UE may be changed. This may be referred to as handover, or a MN handover.

According to various embodiments, a SN may newly start providing radio resources to the UE, establishing a connection with the UE, and/or communicating with the UE (i.e., SN for the UE may be newly added). This may be referred to as a SN addition.

According to various embodiments, a SN for the UE may be changed while the MN for the UE is maintained. This may be referred to as a SN change.

According to various embodiments, DC may comprise E-UTRAN NR-DC (EN-DC), and/or multi-radio access technology (RAT)-DC (MR-DC). EN-DC refers to a DC situation in which a UE utilizes radio resources provided by E-UTRAN node and NR RAN node. MR-DC refers to a DC situation in which a UE utilizes radio resources provided by RAN nodes with different RATs.

Hereinafter, cell group activation/deactivation is described.

In some implementations, a UE may consider a cell group as being in a deactivated state/dormant state for power saving. For example, the UE may consider the cell group as being in the deactivated/dormant state if the UE receives a command via MAC CE or DCI from a network. For another example, the UE may consider the cell group as being in the deactivated/dormant state if a pre-determined condition is met (e.g., there is no traffic activity on UL and/or DL on the cell group for a pre-determined period). The UE may consider the cell group as being in an activated state if the UE receives a command via MAC CE or DCI from a network, a deactivation/dormant period on the cell group expires or a random access (RA) is triggered on the cell group during the deactivated/dormant state. The cell group may comprise MCG and/or SCG.

In some implementations, a UE may consider a BWP as being in a deactivated state/dormant state for power saving. For example, the UE may consider the BWP as being in the deactivated/dormant state if the UE receives a command via MAC CE or DCI from a network. For another example, the UE may consider the BWP as being in the deactivated/dormant state if a pre-determined condition is met (e.g., there is no traffic activity on UL and/or DL on the BWP for a pre-determined period). The UE may consider the BWP as being in an activated state if the UE receives a command via MAC CE or DCI from a network, a deactivation/dormant period on the BWP expires or a random access (RA) is triggered on the BWP during the deactivated/dormant state.

The activated state may refer to a state in which the UE monitors downlink control channel (PDCCH) for downlink scheduling, performs CSI measurements, performs CSI reporting, if needed, and/or has opportunities to request uplink scheduling, if needed.

The deactivated state may refer to a state in which the UE does not monitor downlink control channel (PDCCH) for downlink scheduling, does not perform CSI measurements and/or does not perform CSI reporting.

The dormant state may refer to a state in which the UE does not monitor downlink control channel (PDCCH) for downlink scheduling, but perform CSI measurements. The UE may not be required to perform CSI reporting in a dormant state to save power consumption. Dormant state may be classified as a sub-state of the activated state.

For a cell group being in the activated state, the UE may monitor a first set of resources for a control channel on the cell group. For a cell group being in the deactivated state/dormant state, the UE may monitor a second set of resources for a control channel on the cell group, or does not monitor a control channel on the cell group. The first/second set of resources for a control channel may comprise a control resource set (CORESET) and/or one or more PDCCHs. The first set of resources may comprise sparser resources than the second set of resources.

According to some implementations of the present disclosure, the UE may be configured with MCG and SCG, i.e., dual connectivity may be configured. The UE may deactivate the SCG if the UE receives a SCG deactivation command (via MAC CE or DCI) from a network (e.g., SCG and/or MCG) or the UE may deactivate the SCG if a pre-defined SCG deactivation condition is met (for instance, there is no traffic activity on UL and/or DL on the SCG for a pre-defined period). Once the SCG is deactivated, the UE may perform a LM/RLM and declare RLF/beam failure based on the second LM configuration to reduce power consumption. The UE may activate the SCG if the UE receives a SCG activation command (via MAC CE or DCI) from a network (e.g., MCG or possibly SCG via opportunistic SCG PDCCH monitoring) or the UE may activate the SCG if pre-defined SCG deactivation period is expired or if random access (RA) is triggered for beam failure recovery during the SCG deactivation. Once the SCG is activated, the UE may perform RLM/LM and declare RLF/beam failure based on the first LM configuration to reduce power consumption.

Meanwhile, SCG of a UE may be deactivated for power saving. While the SCG is deactivated, UE may not receive or transmit any data/signal over SCG resources. To enable fast activation of deactivated SCG, UE may be configured with dedicated RACH resources such as CFRA RACH resources. Network should reserve the RACH resources for the UE and should not configure the same RACH resources to other UEs.

The problem is that network may not exactly know when the SCG of the UE enters activated state (e.g., if UE autonomously deactivates the SCG) or when the deactivated SCG needs to be activated (e.g., if the UE autonomously wants to activate the SCG due to traffic arrival to be sent on SCG). This would result in inefficient utilization of the dedicated RACH resources (i.e., CFRA resources) because network should reserve the resources only for the UE for a long time without sharing the resources with other UEs.

Therefore, the present disclosure provides solutions to select CBRA resource or CFRA resource for SCG activation based on validity information.

Figure 14:
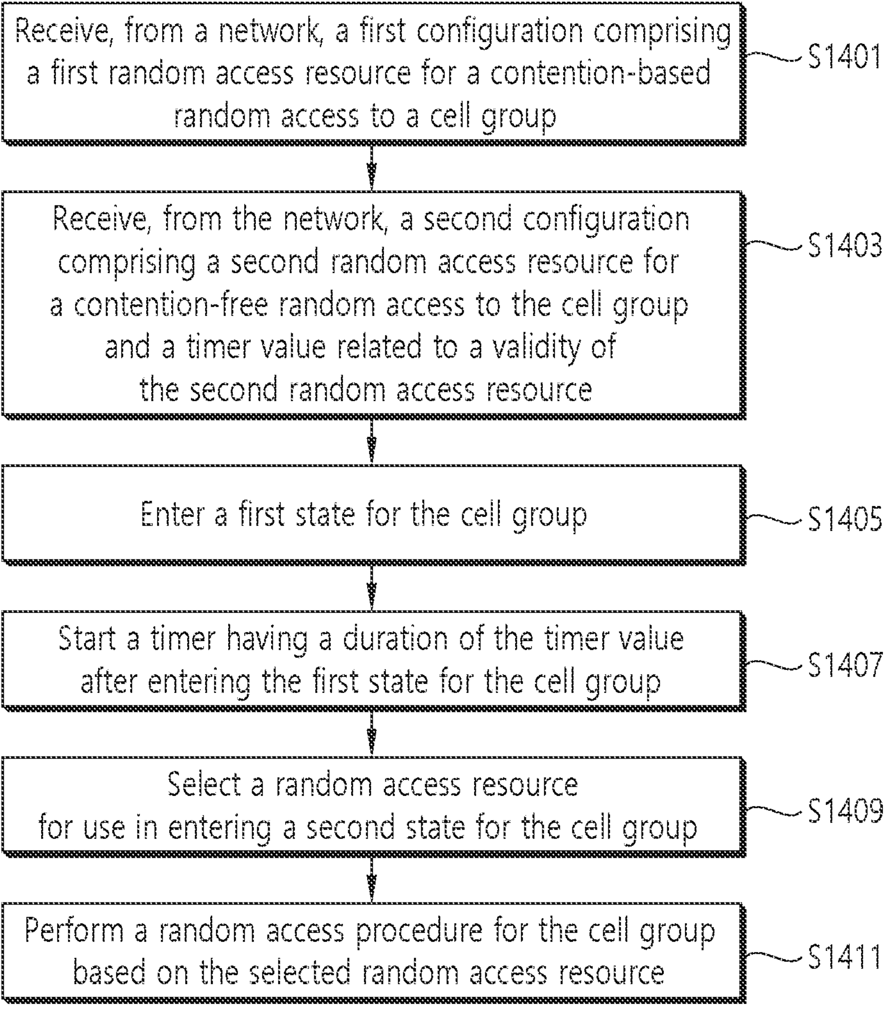
FIG. 14 shows an example of a method performed by a UE according to an embodiment of the present disclosure.

FIG. 14 shows an example of a method performed by a UE according to an embodiment of the present disclosure. The method may also be performed by a wireless device.

Referring to FIG. 14, in step S1401, the UE may receive, from a network, a configuration of a first random access resource for a contention-based random access to a cell group.

In step S1403, the UE may receive, from the network, a configuration of a second random access resource for a contention-free random access to the cell group and validity information comprising a timer value related to a validity of the second random access resource.

In step S1405, the UE may enter a first state for the cell group. The first state may be a state in which the UE monitors a first set of resources for a control channel on the cell group or does not monitor a control channel on the cell group.

In step S1407, the UE may start a timer having a duration of the timer value after entering the first state for the cell group.

In step S1409, the UE may select a random access resource for use in entering a second state for the cell group. The first random access resource may be selected while the timer is not running in the first state. The second random access resource may be selected while the timer is running in the first state. The second state may be a state in which the UE monitors a second set of resources for a control channel on the cell group.

In step S1411, the UE may perform a random access procedure for the cell group based on the selected random access resource.

According to various embodiments, the UE may start the timer upon entering the first state for the cell group.

According to various embodiments, the UE may start the timer upon receiving the configuration of the second random access resource for contention-free random access to the cell group.

According to various embodiments, the UE may start the timer upon receiving the validity information.

According to various embodiments, the UE may start the timer upon receiving an instruction from the network.

According to various embodiments, the UE may select the random access resource for use in entering the second state for the cell group based on identifying data available for transmission to the cell group while in the first state.

According to various embodiments, the UE may enter the first state for the cell group upon receiving a command from the network.

According to various embodiments, the UE may enter the first state for the cell group based on data being not communicated with the cell group for a predetermined or configured time duration.

According to various embodiments, the second random access resource for contention-free random access to the cell group may be released upon an expiry of the timer.

According to various embodiments, the first state may comprise a deactivated state, and the second state comprises an activated state. The cell group may comprise a secondary cell group (SCG) including a primary secondary cell (PSCell). The UE may perform the random access procedure towards the PSCell.

According to various embodiments, the first set of resources and the second set of resources may comprise at least one of a control resource set (CORESET), or a physical downlink control channel (PDCCH).

According to various embodiments, the first set of resources comprise sparser resources than the second set of resources.

Figure 15:
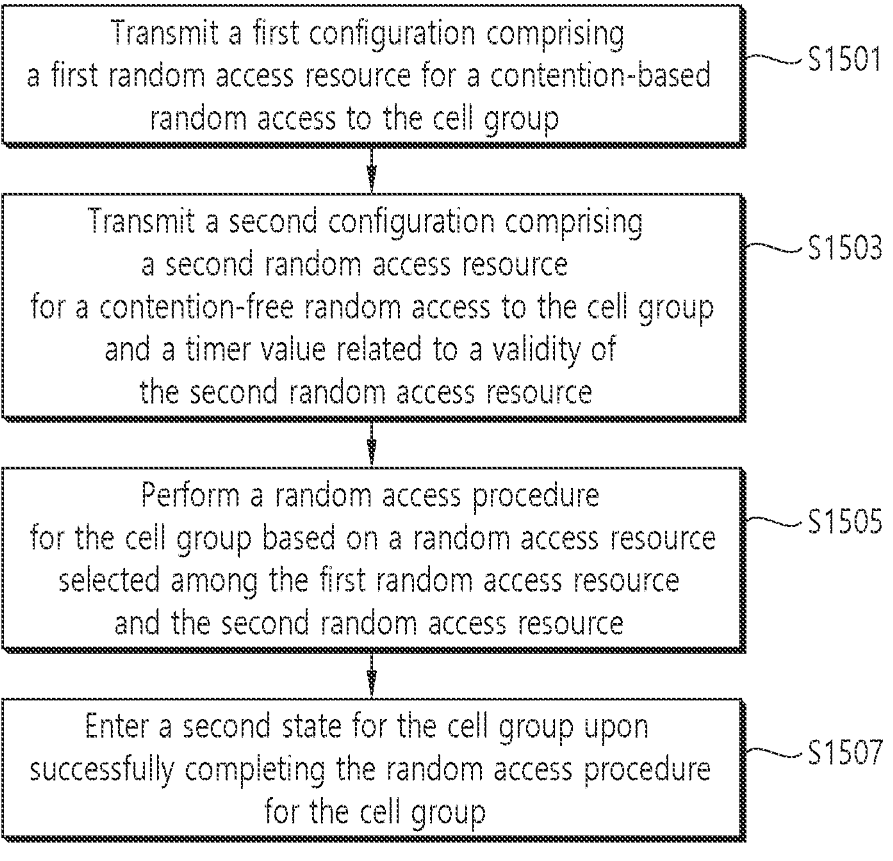
FIG. 15 shows an example of a method performed by a network node related to a cell group according to an embodiment of the present disclosure.

FIG. 15 shows an example of a method performed by a network node related to a cell group according to an embodiment of the present disclosure. The network node may comprise a base station (BS).

Referring to FIG. 15, in step S1501, the network node may transmit a configuration of a first random access resource for a contention-based random access to the cell group.

In step S1503, the network node may transmit a configuration of a second random access resource for a contention-free random access to the cell group and validity information comprising a timer value related to a validity of the second random access resource. A timer having a duration of the timer value may be started after entering a first state for the cell group. The first state may be a state in which a user equipment (UE) monitors a first set of resources for a control channel on the cell group or does not monitor a control channel on the cell group.

In step S1505, the network node may perform a random access procedure for the cell group based on a random access resource selected among the first random access resource and the second random access resource. The first random access resource may be selected while the timer is not running. The second random access resource may be selected while the timer is running.

In step S1507, the network node may enter a second state for the cell group upon successfully completing the random access procedure for the cell group. The second state may be a state in which the UE monitors a second set of resources for a control channel on the cell group.

Figure 16A:
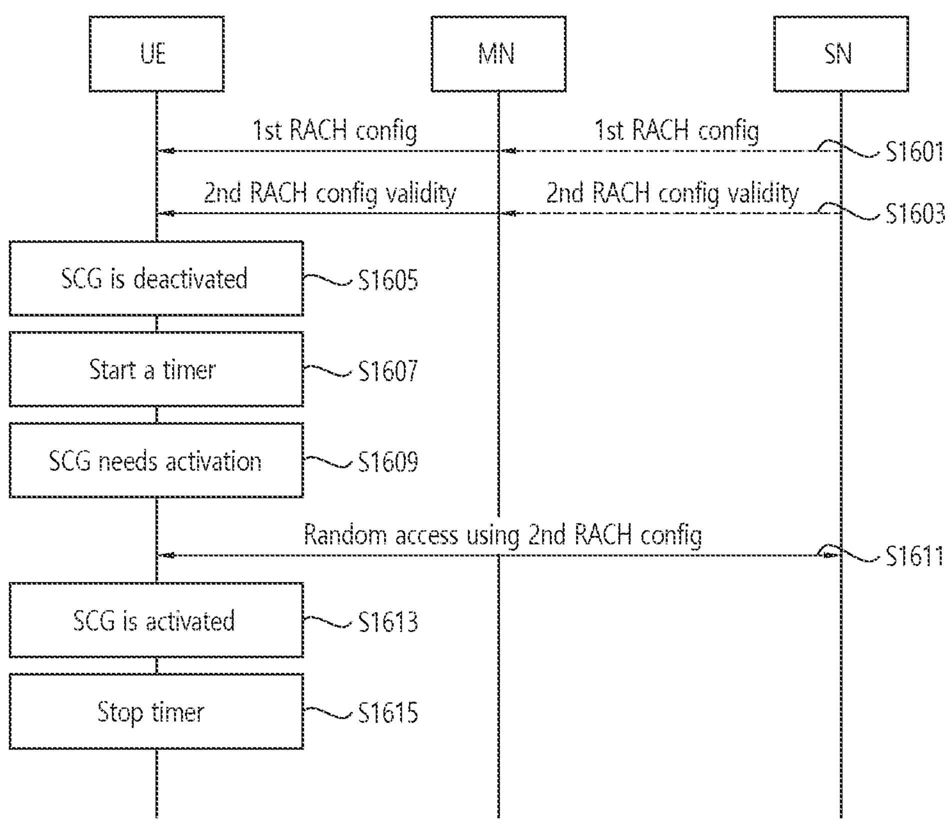
FIGS. 16A and 16B shows an example of a signal flow for starting RACH resource selection timer when SCG enters a deactivated state according to an embodiment of the present disclosure.
Figure 16B:
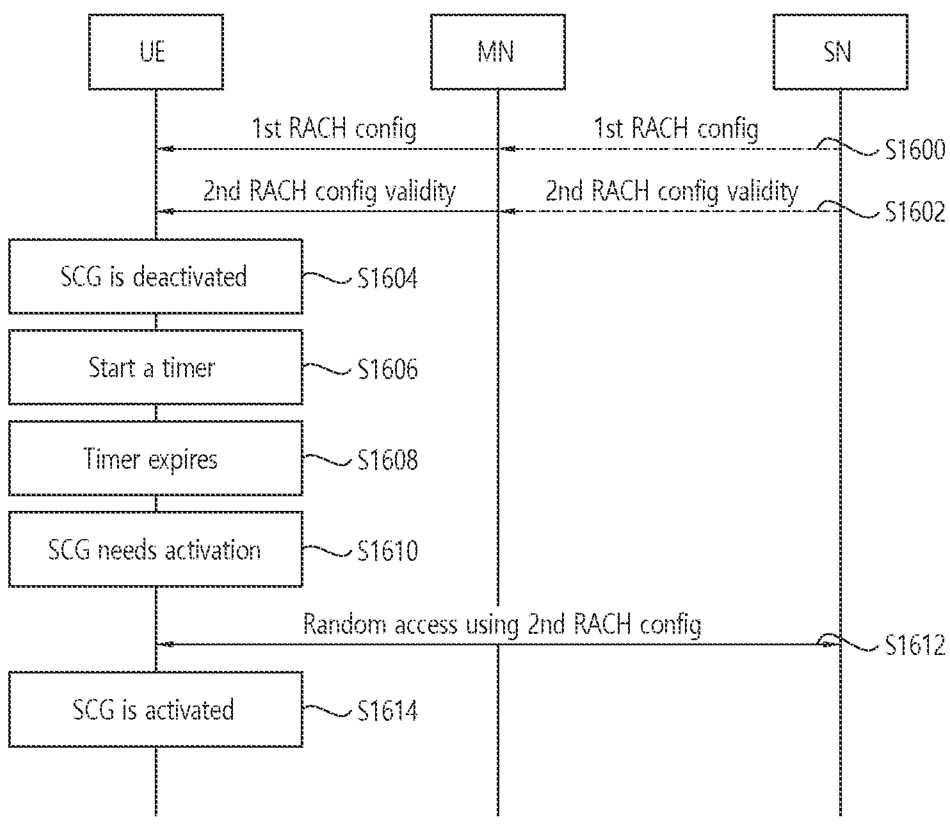

FIGS. 16A and 16B shows an example of a signal flow for starting RACH resource selection timer when SCG enters a deactivated state according to an embodiment of the present disclosure.

FIG. 16A shows a case the SCG needs activation before an expiry of the timer.

Referring to FIG. 16A, in step S1601, the UE may be configured with a first RACH configuration for a SCG. The first RACH configuration may comprise common RACH resources for the SCG or contention based RACH resources for the SCG.

In step S1603, the UE may be configured with a second RACH configuration for the SCG. The second RACH configuration may comprise at least one set of dedicated RACH resource and its parameters and a time duration for the SCG.

The set of dedicated RACH resources may comprise radio resources for contention-free random access such as CFRA preamble resource and its parameters.

The RACH resources and the timer duration may be configured via RRC message while the SCG is activated.

The RACH resources and the timer duration may be configured for a PSCell of the SCG.

The time duration may be related to the validity of the dedicated RACH resources.

The UE may not be allowed to use the dedicated RACH resources while the SCG is activated.

In step S1605, the SCG may be deactivated. The UE may receive a command for SCG deactivation. The UE may deactivate the SCG by its autonomous decision based on traffic condition on the SCG resources (e.g. no traffic sent/received for a defined time duration).

In step S1607, when SCG of the UE enters a deactivated state, the UE may start a timer set to the time duration.

The UE is allowed to use the dedicated RACH resources only while the timer is running, his means that the dedicated RACH resources becomes applicable only after the SCG of the UE enters a deactivated state.

In step S1609, the UE may determine that the SCG needs to be activated, when the UE identifies data available for transmission to the SCG and/or identifies traffic arrival to be sent on the SCG. In FIG. 16A, the UE may determine that the SCG needs to be activated before an expiry of the timer.

In step S1611, when the SCG needs to be activated, the UE may use/select the dedicated RACH resource to perform random access to the PSCell/SCG if the dedicated RACH resource is applicable.

In step S1613, if the random access is successful, the UE may consider that the SCG is activated and/or the UE may activate the SCG.

In step S1615, the UE may stop the timer upon activating the SCG.

For example, upon stopping the timer or upon SCG activation, the UE may discard the dedicated RACH resource.

For example, upon stopping the timer or upon SCG activation, the UE may keep the dedicated RACH resource for later use, e.g., when the SCG of the UE re-enters a deactivated state, in order to save signalling overhead for configuring the dedicated RACH resources to the UE.

FIG. 16B shows a case the SCG needs activation after the expiry of the timer.

Referring to FIG. 16B, in step S1600, the UE may be configured with a first RACH configuration for a SCG. The first RACH configuration may comprise common RACH resources for the SCG or contention based RACH resources for the SCG.

In step S1602, the UE may be configured with a second RACH configuration for the SCG. The second RACH configuration may comprise at least one set of dedicated RACH resource and its parameters and a time duration for the SCG.

The set of dedicated RACH resources may comprise radio resources for contention-free random access such as CFRA preamble resource and its parameters.

The RACH resources and the timer duration may be configured via RRC message while the SCG is activated.

The RACH resources and the timer duration may be configured for a PSCell of the SCG.

The time duration may be related to the validity of the dedicated RACH resources.

The UE may not be allowed to use the dedicated RACH resources while the SCG is activated.

In step S1604, the SCG may be deactivated. The UE may autonomously deactivate the SCG, or deactivate the SCG upon receiving a command from network.

In step S1606, when SCG of the UE enters a deactivated state, the UE may start a timer set to the time duration.

The UE may receive a command for SCG deactivation.

The UE may deactivate the SCG by its autonomous decision based on traffic condition on the SCG resources (e.g. no traffic sent/received for a defined time duration).

The UE is allowed to use the dedicated RACH resources only while the timer is running. This means that the dedicated RACH resources becomes applicable only after the SCG of the UE enters a deactivated state.

In step S1608, the UE may identify that the timer expires. In FIG. 16B, the timer expires before the UE determines the SCG needs to be activated.

If the timer expires:

the UE may discard the dedicated resources; and/or the UE may keep the dedicated resource but consider that the dedicated RACH resource is no longer applicable.

In step S1610, the UE may determine that the SCG needs to be activated, when the UE identifies data available for transmission to the SCG and/or identifies traffic arrival to be sent on the SCG.

In step S1612, when the SCG needs to be activated, the UE may use/select the common RACH resource to perform random access to the PSCell/SCG.

In step S1614, if the random access is successful, the UE may consider that the SCG is activated and/or the UE may activate the SCG.

For example, upon SCG activation, the UE may discard the dedicated RACH resource.

For example, upon SCG activation, the UE may keep the dedicated RACH resource for later use, e.g., when the SCG of the UE re-enters a deactivated state, in order to save signalling overhead for configuring the dedicated RACH resources to the UE.

Figure 17A:
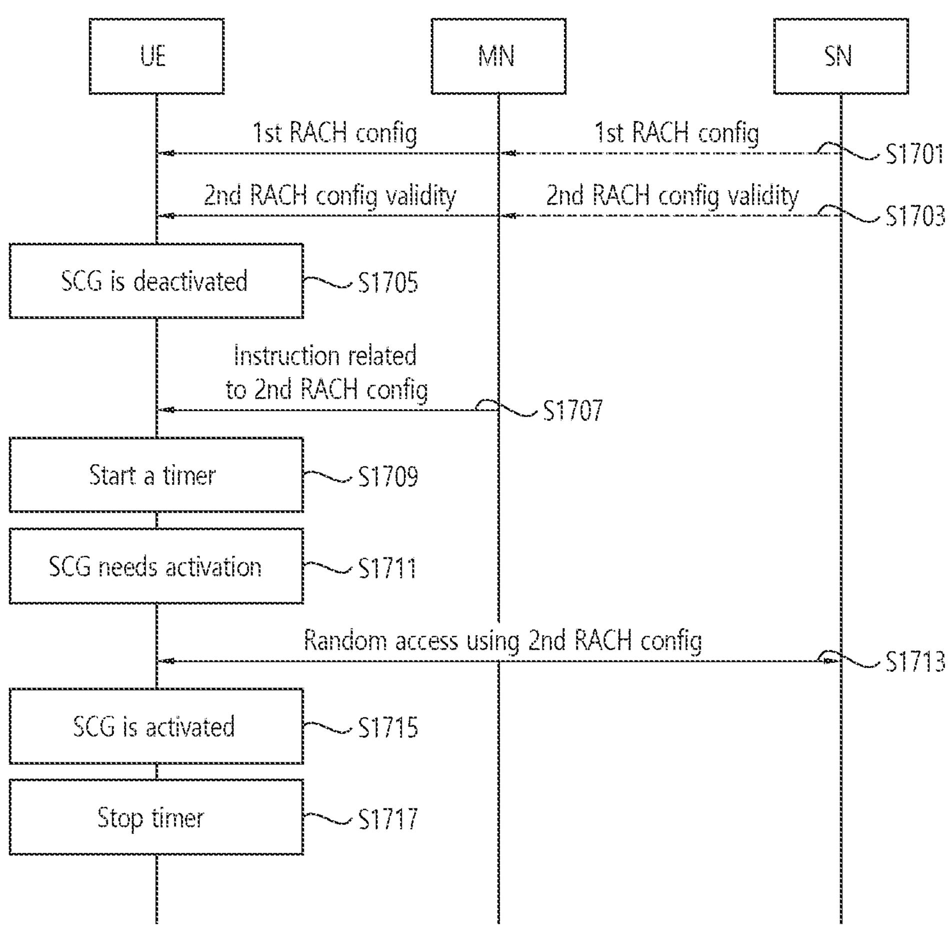
FIGS. 17A and 17B shows an example of a signal flow for starting RACH resource selection timer upon receiving an instruction from a network according to an embodiment of the present disclosure.
Figure 17B:
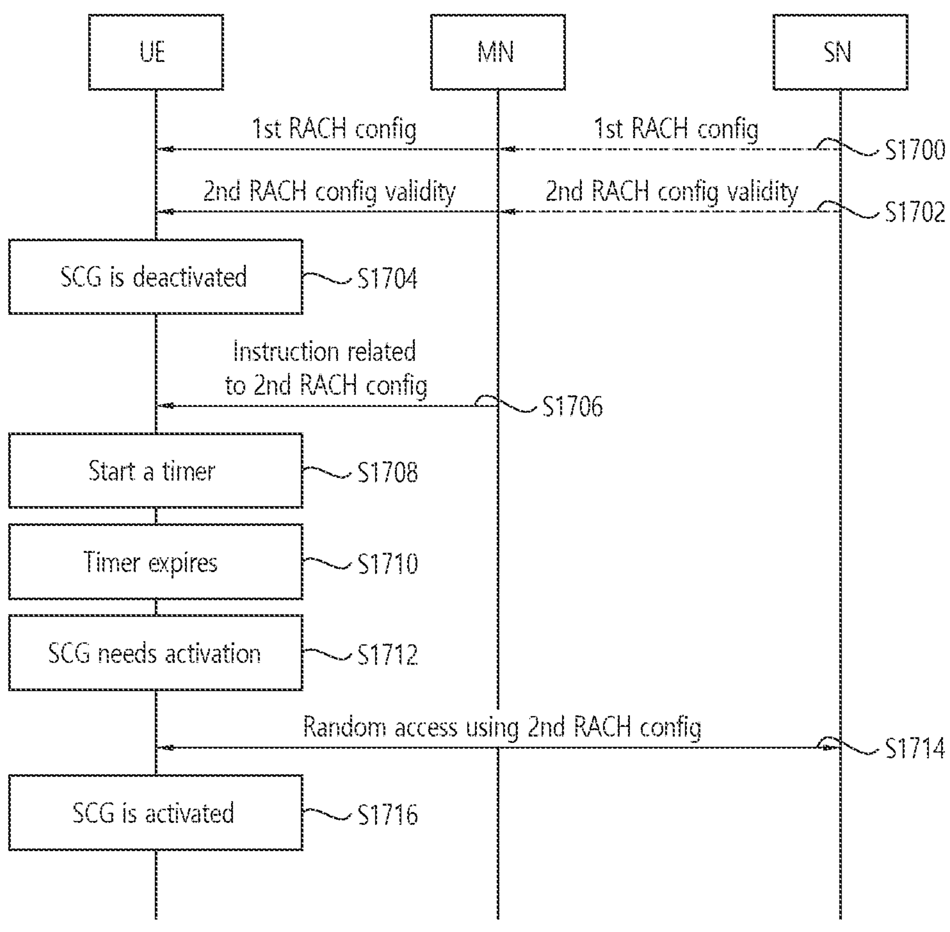

FIGS. 17A and 17B shows an example of a signal flow for starting RACH resource selection timer upon receiving an instruction from a network according to an embodiment of the present disclosure.

FIG. 17A shows a case the SCG needs activation before an expiry of the timer.

Referring to FIG. 17A, in step S1701, the UE may be configured with a first RACH configuration for a SCG. The first RACH configuration may comprise common RACH resources for the SCG or contention based RACH resources for the SCG.

In step S1703, the UE may be configured with a second RACH configuration for the SCG. The second RACH configuration may comprise at least one set of dedicated RACH resource and its parameters and a time duration for the SCG.

The RACH resources and the timer duration may be configured via RRC message or lower layer signalling (MAC CE or DCI) sent on MCG while the SCG is deactivated.

The RACH resource may be configured via lower layer signalling (MAC CE or DCI) sent on MCG while the SCG is deactivated but the time duration value may be configured via RRC while SCG is activated.

The set of dedicated RACH resources may be radio resources for contention-free random access such as CFRA preamble resource and its parameters.

The RACH resources and the timer duration may be configured for a PSCell of the SCG.

The time duration may be related to the validity of the dedicated RACH resources.

In step S1705, the SCG may be deactivated. The UE may autonomously deactivate the SCG, or deactivate the SCG upon receiving a command from network.

In step S1707, the UE may receive an instruction/indication related to the validity of the dedicated RACH resource w % bile the SCG is deactivated.

In step S1709, upon reception of the indication/instruction related to the validity of the dedicated RACH resource while the SCG is deactivated, the UE may start a timer set to the time duration.

The UE is allowed to use the dedicated RACH resources only while the timer is running. This means that the dedicated RACH resources becomes applicable only while the SCG of the UE is in a deactivated state.

In step S1711, the UE may determine that the SCG needs to be activated, when the UE identifies data available for transmission to the SCG and/or identifies traffic arrival to be sent on the SCG. In FIG. 17A, the UE may determine that the SCG needs to be activated before an expiry of the timer.

In step S1713, when the SCG needs to be activated, the UE may use/select the dedicated RACH resource to perform random access to the PSCell/SCG if the dedicated RACH resource is applicable.

In step S1715, if the random access is successful, the UE may consider that the SCG is activated and/or the UE may activate the SCG.

In step S1717, the UE may stop the timer upon activating the SCG.

For example, upon stopping the timer or upon SCG activation, the UE may discard the dedicated RACH resource.

For example, upon stopping the timer or upon SCG activation, the UE may keep the dedicated RACH resource for later use, e.g., when the SCG of the UE re-enters a deactivated state, in order to save signalling overhead for configuring the dedicated RACH resources to the UE.

FIG. 17B shows a case the SCG needs activation after an expiry of the timer.

Referring to FIG. 17B, in step S1700, the UE may be configured with a first RACH configuration for a SCG. The first RACH configuration may comprise common RACH resources for the SCG or contention based RACH resources for the SCG.

In step S1702, the UE may be configured with a second RACH configuration for the SCG. The second RACH configuration may comprise at least one set of dedicated RACH resource and its parameters and a time duration for the SCG.

The RACH resources and the timer duration may be configured via RRC message or lower layer signalling (MAC CE or DCI) sent on MCG while the SCG is deactivated.

The RACH resource may be configured via lower layer signalling (MAC CE or DCI) sent on MCG while the SCG is deactivated but the time duration value may be configured via RRC while SCG is activated.

The set of dedicated RACH resources may be radio resources for contention-free random access such as CFRA preamble resource and its parameters.

The RACH resources and the timer duration may be configured for a PSCell of the SCG.

The time duration may be related to the validity of the dedicated RACH resources.

In step S1704, the SCG may be deactivated. The UE may autonomously deactivate the SCG, or deactivate the SCG upon receiving a command from network.

In step S1706, the UE may receive an instruction/indication related to the validity of the dedicated RACH resource while the SCG is deactivated.

In step S1708, upon reception of the indication/instruction related to the validity of the dedicated RACH resource while the SCG is deactivated, the UE may start a timer set to the time duration.

The UE is allowed to use the dedicated RACH resources only while the timer is running. This means that the dedicated RACH resources becomes applicable only while the SCG of the UE is in a deactivated state.

In step S1710, the UE may identify that the timer expires, In FIG. 17B, the timer expires before the UE may determine the SCG needs to be activated.

If the timer expires:

the UE may discard the dedicated resources; and/or the UE may keep the dedicated resource but considers that the dedicated RACH resource is no longer applicable.

In step S1712, the UE may determine that the SCG needs to be activated, when the UE identifies data available for transmission to the SCG and/or identifies traffic arrival to be sent on the SCG.

In step S1714, when the SCG needs to be activated, the UE may use/select the common RACH resource to perform random access to the PSCell/SCG.

In step S1716, if the random access is successful, the UE may consider that the SCG is activated and/or the UE may activate the SCG.

For example, upon SCG activation, the UE may discard the dedicated RACH resource.

For example, upon SCG activation, the UE may keep the dedicated RACH resource for later use, e.g., when the SCG of the UE re-enters a deactivated state, in order to save signalling overhead for configuring the dedicated RACH resources to the UE.

Figure 18A:
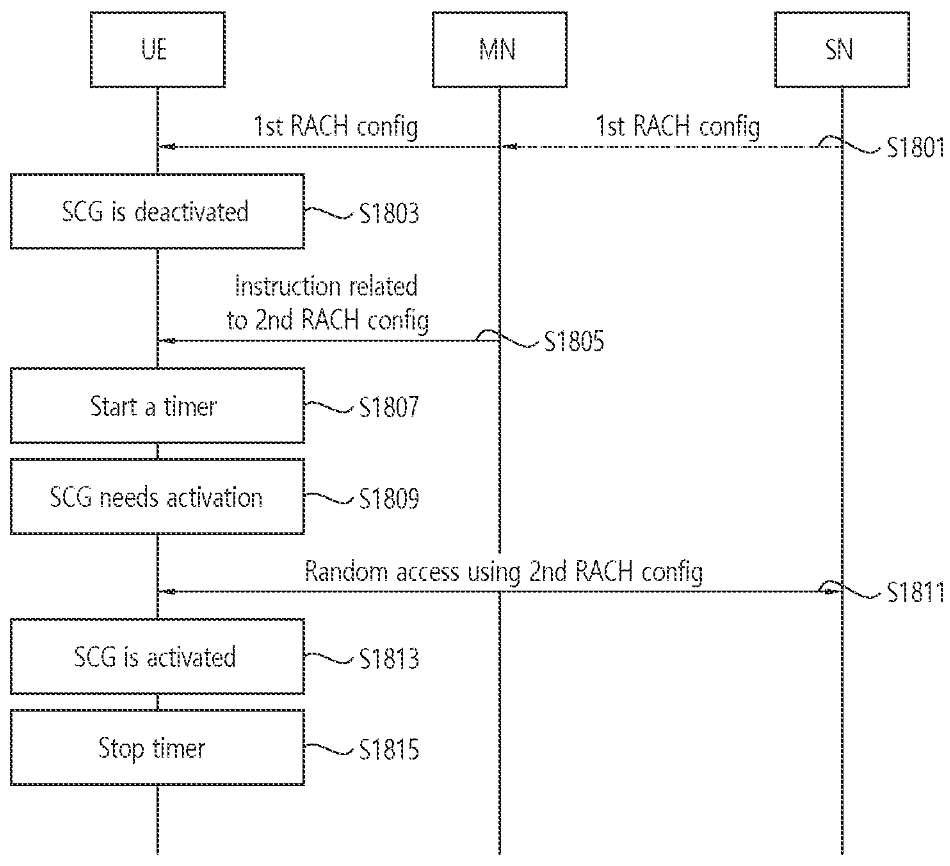
FIGS. 18A and 18B shows an example of a signal flow for starting RACH resource selection timer upon receiving a dedicated RACH configuration according to an embodiment of the present disclosure.
Figure 18B:
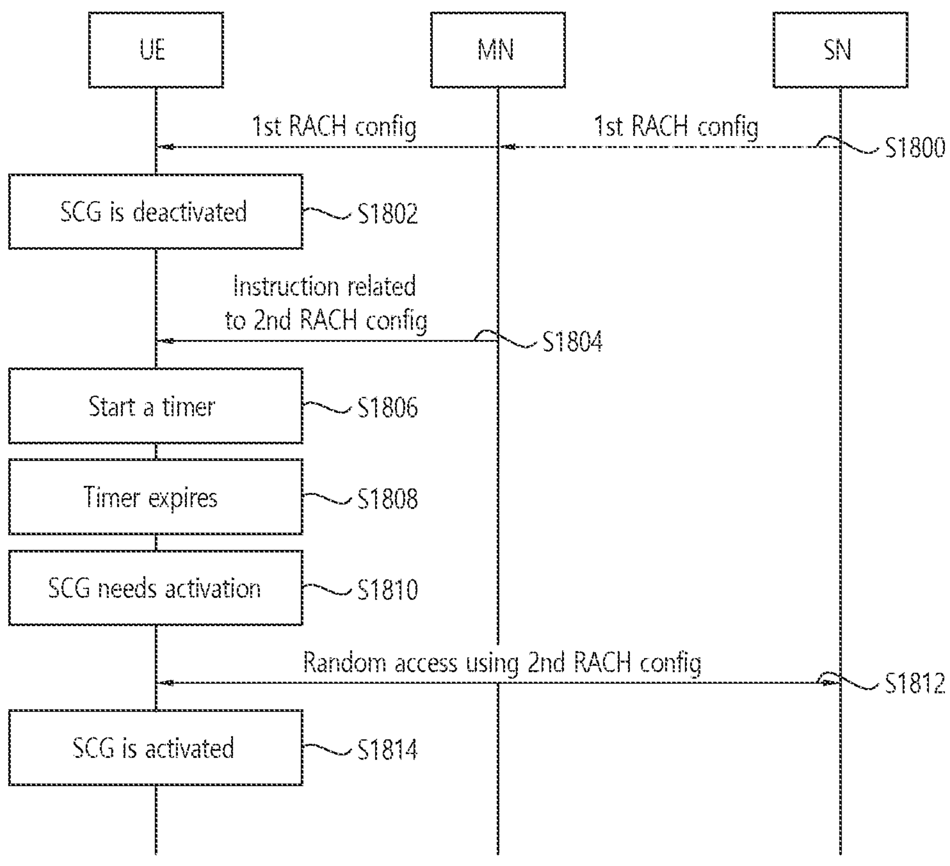

FIGS. 18A and 18B shows an example of a signal flow for starting RACH resource selection timer upon receiving a dedicated RACH configuration according to an embodiment of the present disclosure.

FIG. 18A shows a case the SCG needs activation before an expiry of the timer.

Referring to FIG. 18A, in step S1801, the UE may be configured with a first RACH configuration for a SCG. The first RACH configuration may comprise common RACH resources for the SCG or contention based RACH resources for the SCG.

In step S1803, the SCG may be deactivated. The UE may autonomously deactivate the SCG, or deactivate the SCG upon receiving a command from network.

In step S1805, the UE may be configured with a second RACH configuration for the SCG. The second RACH configuration may comprise at least one set of dedicated RACH resource and its parameters and a time duration for the SCG.

The RACH resources and the timer duration may be configured via RRC message or lower layer signalling (MAC CE or DCI) sent on MCG while the SCG is deactivated.

The RACH resource may be configured via lower layer signalling (MAC CE or DCI) sent on MCG while the SCG is deactivated but the time duration value may be configured via RRC while SCG is activated.

The set of dedicated RACH resources may be radio resources for contention-free random access such as CFRA preamble resource and its parameters.

The RACH resources and the timer duration may be configured for a PSCell of the SCG.

The time duration may be related to the validity of the dedicated RACH resources.

The UE may also receive an instruction/indication related to the validity of the dedicated RACH resource while the SCG is deactivated. The indication/instruction may be included in the second RACH configuration.

In step S1807, upon reception of the dedicated RACH resources while the SCG is deactivated and/or upon reception of the indication/instruction related to the validity of the dedicated RACH resource while the SCG is deactivated, the UE may start a timer set to the time duration.

The UE is allowed to use the dedicated RACH resources only while the timer is running. This means that the dedicated RACH resources becomes applicable only while the SCG of the UE is in a deactivated state.

In step S1809, the UE may determine that the SCG needs to be activated, when the UE identifies data available for transmission to the SCG and/or identifies traffic arrival to be sent on the SCG. In FIG. 17A, the UE may determine that the SCG needs to be activated before an expiry of the timer.

In step S1811, when the SCG needs to be activated, the UE may use/select the dedicated RACH resource to perform random access to the PSCell/SCG if the dedicated RACH resource is applicable.

In step S1813, if the random access is successful, the UE may consider that the SCG is activated and/or the UE may activate the SCG.

In step S1815, the UE may stop the timer upon activating the SCG.

For example, upon stopping the timer or upon SCG activation, the UE may discard the dedicated RACH resource.

For example, upon stopping the timer or upon SCG activation, the UE may keep the dedicated RACH resource for later use, e.g., when the SCG of the UE re-enters a deactivated state, in order to save signalling overhead for configuring the dedicated RACH resources to the UE.

FIG. 18B shows a case the SCG needs activation after an expiry of the timer.

Referring to FIG. 18B, in step S1800, the UE may be configured with a first RACH configuration for a SCG. The first RACH configuration may comprise common RACH resources for the SCG or contention based RACH resources for the SCG.

In step S1802, the SCG may be deactivated. The UE may autonomously deactivate the SCG, or deactivate the SCG upon receiving a command from network.

In step S1804, the UE may be configured with a second RACH configuration for the SCG. The second RACH configuration may comprise at least one set of dedicated RACH resource and its parameters and a time duration for the SCG.

The RACH resources and the timer duration may be configured via RRC message or lower layer signalling (MAC CE or DCI) sent on MCG while the SCG is deactivated.

The RACH resource may be configured via lower layer signalling (MAC CE or DCI) sent on MCG while the SCG is deactivated but the time duration value may be configured via RRC while SCG is activated.

The set of dedicated RACH resources may be radio resources for contention-free random access such as CFRA preamble resource and its parameters.

The RACH resources and the timer duration may be configured for a PSCell of the SCG.

The time duration may be related to the validity of the dedicated RACH resources.

The UE may receive an instruction/indication related to the validity of the dedicated RACH resource while the SCG is deactivated. The instruction/indication may be included in the second RACH configuration.

In step S1806, upon reception of the dedicated RACH resources while the SCG is deactivated and/or upon reception of the indication/instruction related to the validity of the dedicated RACH resource while the SCG is deactivated, the UE may start a timer set to the time duration.

The UE is allowed to use the dedicated RACH resources only while the timer is running. This means that the dedicated RACH resources becomes applicable only while the SCG of the UE is in a deactivated state.

In step S1808, the UE may identify that the timer expires, In FIG. 18B, the timer expires before the UE may determine the SCG needs to be activated.

If the timer expires:

- the UE may discard the dedicated resources, and/or
- the UE may keep the dedicated resource but considers that the dedicated RACH resource is no longer applicable.

In step S1810, the UE may determine that the SCG needs to be activated, when the UE identifies data available for transmission to the SCG and/or identifies traffic arrival to be sent on the SCG.

In step S1812, when the SCG needs to be activated, the UE may use/select the common RACH resource to perform random access to the PSCell/SCG.

In step S1814, if the random access is successful, the UE may consider that the SCG is activated and/or the UE may activate the SCG.

For example, upon SCG activation, the UE may discard the dedicated RACH resource.

For example, upon SCG activation, the UE may keep the dedicated RACH resource for later use, e.g., when the SCG of the UE re-enters a deactivated state, in order to save signalling overhead for configuring the dedicated RACH resources to the UE.

Furthermore, the method in perspective of the UE described above in FIG. 14 may be performed by first wireless device 100 shown in FIG. 2, the wireless device 100 shown in FIG. 3, the first wireless device 100 shown in FIG. 4 and/or the UE 100 shown in FIG. 5.

More specifically, the UE comprises at least one transceiver, at least processor, and at least one computer memory operably connectable to the at least one processor and storing instructions that, based on being executed by the at least one processor, perform operations.

The operations comprise: receiving, from a network, a configuration of a first random access resource for a contention-based random access to a cell group; receiving, from the network, a configuration of a second random access resource for a contention-free random access to the cell group and validity information comprising a timer value related to a validity of the second random access resource; entering a first state for the cell group; starting a timer having a duration of the timer value after entering the first state for the cell group; selecting a random access resource for use in entering a second state for the cell group; and performing a random access procedure for the cell group based on the selected random access resource. The first random access resource may be selected while the timer is not running. The second random access resource may be selected while the timer is running. The first state may be a state in which the UE monitors a first set of resources for a control channel on the cell group or does not monitor a control channel on the cell group. The second state may be a state in which the UE monitors a second set of resources for a control channel on the cell group.

Furthermore, the method in perspective of the UE described above in FIG. 14 may be performed by a software code 105 stored in the memory 104 included in the first wireless device 100 shown in FIG. 4.

More specifically, at least one computer readable medium (CRM) stores instructions that, based on being executed by at least one processor, perform operations comprising: receiving, from a network, a configuration of a first random access resource for a contention-based random access to a cell group; receiving, from the network, a configuration of a second random access resource for a contention-free random access to the cell group and validity information comprising a timer value related to a validity of the second random access resource; entering a first state for the cell group; starting a timer having a duration of the timer value after entering the first state for the cell group; selecting a random access resource for use in entering a second state for the cell group; and performing a random access procedure for the cell group based on the selected random access resource. The first random access resource may be selected while the timer is not running. The second random access resource may be selected while the timer is running. The first state may be a state in which the UE monitors a first set of resources for a control channel on the cell group or does not monitor a control channel on the cell group. The second state may be a state in which the UE monitors a second set of resources for a control channel on the cell group.

Furthermore, the method in perspective of the UE described above in FIG. 14 may be performed by control of the processor 102 included in the first wireless device 100 shown in FIG. 2, by control of the communication unit 110 and/or the control unit 120 included in the wireless device 100 shown in FIG. 3, by control of the processor 102 included in the first wireless device 100 shown in FIG. 4 and/or by control of the processor 102 included in the UE 100 shown in FIG. 5.

More specifically, an apparatus configured to operate in a wireless communication system (e.g., wireless device/UE) comprises at least processor, and at least one computer memory operably connectable to the at least one processor. The at least one processor is configured to perform operations comprising: receiving, from a network, a configuration of a first random access resource for a contention-based random access to a cell group; receiving, from the network, a configuration of a second random access resource for a contention-free random access to the cell group and validity information comprising a timer value related to a validity of the second random access resource; entering a first state for the cell group; starting a timer having a duration of the timer value after entering the first state for the cell group; selecting a random access resource for use in entering a second state for the cell group; and performing a random access procedure for the cell group based on the selected random access resource. The first random access resource may be selected while the timer is not running. The second random access resource may be selected while the timer is running. The first state may be a state in which the UE monitors a first set of resources for a control channel on the cell group or does not monitor a control channel on the cell group. The second state may be a state in which the UE monitors a second set of resources for a control channel on the cell group.

Furthermore, the method in perspective of the network node related to a cell group described above in FIG. 15 may be performed by second wireless device 100 shown in FIG. 2, the device 100 shown in FIG. 3, and/or the second wireless device 200 shown in FIG. 4.

More specifically, the network node comprises at least one transceiver, at least processor, and at least one computer memory operably connectable to the at least one processor and storing instructions that, based on being executed by the at least one processor, perform operations.

The operations comprise: transmitting a configuration of a first random access resource for a contention-based random access to the cell group; transmitting a configuration of a second random access resource for a contention-free random access to the cell group and validity information comprising a timer value related to a validity of the second random access resource—a timer having a duration of the timer value is started after entering a first state for the cell group, performing a random access procedure for the cell group based on a random access resource selected among the first random access resource and the second random access resource; and entering a second state for the cell group upon successfully completing the random access procedure for the cell group. The first random access resource may be selected while the timer is not running. The second random access resource may be selected while the timer is running. The first state may be a state in which a user equipment (UE) monitors a first set of resources for a control channel on the cell group or does not monitor a control channel on the cell group. The second state may be a state in which the UE monitors a second set of resources for a control channel on the cell group.

According to various embodiments, UE may be configured with more than one dedicated RACH resources and their parameters applicable for deactivated SCG. Then network may inform the UE of which of the dedicated RACH resources are applicable or not applicable. For instance, network may configure multiple UEs with the same dedicated RACH resources via RRC and update the applicable dedicated RACH resources to individual UE via lower layer signalling whenever needed such that collision due to the use of the same RACH resource is possibly avoided. When dedicated RACH resources and parameters are configured, index for each set comprising RACH resource and its parameters may be configured. The update of the applicable dedicated RACH resources may comprise indicating one or more indices of applicable RACH resources or one or more indices of non-applicable RACH resources.

According to the disclosure of various embodiments, the UE may be configured with an indication of whether the UE shall start the timer when the SCG enters a deactivated state.

According to various embodiments, the UE may be configured with dedicated resources that are not restricted to RACH resources. For example, the UE may be configured with dedicated beam resources or dedicated UL transmission resources for the second of the cell group or for use during transition from the first state to the second state of the cell group. Once the resources are configured to the UE, the resources may be considered valid within a certain duration upon entering the first state of the cell group. If the dedicated resources are valid upon transition from the first state to the second state of the cell group, the UE may use the dedicated resources during or after the transition from the first state to the second state of the cell group. If the dedicated resources are not valid upon transition from the first state to the second state of the cell group, the UE may perform actions to acquire valid dedicated resources during or after the transition from the first state to the second state of the cell group.

The present disclosure can have various advantageous effects.

For example, network can efficiently utilize the RACH resources configured to a UE by opportunistically or exclusively reusing the resources for other UEs.

For example, fast SCG activation based on CFRA can be supported while the network re-allocates the CFRA resources being unused for more than a pre-defined time period to other UEs, so that the CFRA resources can be efficiently utilized.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

Claims in the present disclosure can be combined in a various way. For instance, technical features in method claims of the present disclosure can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A method performed by a user equipment (UE) in a wireless communication system, the method comprising:

receiving, from a network, a configuration of a first random access resource for a contention-based random access to a cell group;

receiving, from the network, a configuration of a second random access resource for a contention-free random access to the cell group and validity information comprising a timer value related to a validity of the second random access resource;

entering a first state for the cell group;

starting a timer having a duration of the timer value after entering the first state for the cell group;

selecting a random access resource for use in entering a second state for the cell group; and performing a random access procedure for the cell group based on the selected random access resource, wherein the first random access resource is selected while the timer is not running, wherein the second random access resource is selected while the timer is running, wherein the first state is a state in which the UE monitors a first set of resources for a control channel on the cell group or does not monitor a control channel on the cell group, and wherein the second state is a state in which the UE monitors a second set of resources for a control channel on the cell group.

2. The method of claim 1, wherein the starting of the timer comprises starting the timer upon entering the first state for the cell group.

3. The method of claim 1, wherein the starting of the timer comprises starting the timer upon receiving the configuration of the second random access resource for contention-free random access to the cell group.

4. The method of claim 1, wherein the starting of the timer comprises starting the timer upon receiving the validity information.

5. The method of claim 1, wherein the starting of the timer comprises starting the timer upon receiving an instruction from the network.

6. The method of claim 1, wherein the selecting of the random access resource comprises selecting the random access resource for use in entering the second state for the cell group based on identifying data available for transmission to the cell group while in the first state.

7. The method of claim 1, wherein the entering the first state for the cell group comprises entering the first state for the cell group upon receiving a command from the network.

8. The method of claim 1, wherein the entering the first state for the cell group comprises entering the first state for the cell group based on data being not communicated with the cell group for a predetermined or configured time duration.

9. The method of claim 1, wherein the second random access resource for contention-free random access to the cell group is released upon an expiry of the timer.

10. The method of claim 1, wherein the first state comprises a deactivated state, and the second state comprises an activated state, wherein the cell group comprises a secondary cell group (SCG) including a primary secondary cell (PSCell), and wherein the performing of the random access procedure for the cell group comprises performing the random access procedure towards the PSCell.

11. The method of claim 1, wherein the first set of resources and the second set of resources comprise at least one of a control resource set (CORESET), or a physical downlink control channel (PDCCH).

12. The method of claim 1, wherein the first set of resources may comprise sparser resources than the second set of resources.

13. The method of claim 1, wherein the UE is in communication with at least one of a mobile device, a network, or autonomous vehicles other than the UE.

14. A user equipment (UE) configured to operate in a wireless communication system, the UE comprising:

at least one transceiver;

at least processor; and at least one computer memory operably connectable to the at least one processor and storing instructions that, based on being executed by the at least one processor, perform operations comprising:

receiving, from a network, a configuration of a first random access resource for a contention-based random access to a cell group;

receiving, from the network, a configuration of a second random access resource for a contention-free random access to the cell group and validity information comprising a timer value related to a validity of the second random access resource;

entering a first state for the cell group;

starting a timer having a duration of the timer value after entering the first state for the cell group;

selecting a random access resource for use in entering a second state for the cell group; and performing a random access procedure for the cell group based on the selected random access resource, wherein the first random access resource is selected while the timer is not running, wherein the second random access resource is selected while the timer is running, wherein the first state is a state in which the UE monitors a first set of resources for a control channel on the cell group or does not monitor a control channel on the cell group, and wherein the second state is a state in which the UE monitors a second set of resources for a control channel on the cell group.

15. A network node related to a cell group configured to operate in a wireless communication system, the network node comprising:

at least one transceiver;

at least processor; and at least one computer memory operably connectable to the at least one processor and storing instructions that, based on being executed by the at least one processor, perform operations comprising:

transmitting a configuration of a first random access resource for a contention-based random access to the cell group;

transmitting a configuration of a second random access resource for a contention-free random access to the cell group and validity information comprising a timer value related to a validity of the second random access resource, wherein a timer having a duration of the timer value is started after entering a first state for the cell group;

performing a random access procedure for the cell group based on a random access resource selected among the first random access resource and the second random access resource; and entering a second state for the cell group upon successfully completing the random access procedure for the cell group, wherein the first random access resource is selected while the timer is not running, wherein the second random access resource is selected while the timer is running, wherein the first state is a state in which a user equipment (UE) monitors a first set of resources for a control channel on the cell group or does not monitor a control channel on the cell group, and wherein the second state is a state in which the UE monitors a second set of resources for a control channel on the cell group.

* * * * *